(12) United States Patent
Ritchey

(10) Patent No.: US 8,212,445 B2
(45) Date of Patent: Jul. 3, 2012

(54) POLYPHASIC MULTI-COIL ELECTRIC DEVICE

(75) Inventor: Jonathan Gale Ritchey, Vernon (CA)

(73) Assignee: Exro Technologies Inc., West Vancouver (CA)

( * ) Notice: Subject to any disclaimer, the term of this patent is extended or adjusted under 35 U.S.C. 154(b) by 0 days.

(21) Appl. No.: 12/545,027

(22) Filed: Aug. 20, 2009

(65) Prior Publication Data

US 2010/0019593 A1  Jan. 28, 2010

Related U.S. Application Data

(63) Continuation of application No. 11/477,493, filed on Jun. 30, 2006, now Pat. No. 7,595,574, and a continuation of application No. 11/036,052, filed on Jan. 18, 2005, now Pat. No. 7,081,696, and a continuation-in-part of application No. 10/976,778, filed on Nov. 1, 2004, now abandoned.

(60) Provisional application No. 60/600,723, filed on Aug. 12, 2004.

(51) Int. Cl.
*H02K 7/20* (2006.01)
(52) U.S. Cl. ......... 310/112; 310/114; 310/266; 310/268
(58) Field of Classification Search ................ 310/68 B, 310/68 R, 102, 112–114, 75 R, 78, 96, 156.49, 310/168, 266–268
See application file for complete search history.

(56) References Cited

U.S. PATENT DOCUMENTS

| | | | |
|---|---|---|---|
| 908,097 | A | 12/1908 | Herz |
| 1,980,808 | A | 11/1933 | Liebing |
| 2,091,190 | A | 8/1937 | Randolph et al. |
| 2,407,883 | A | 9/1946 | Jackson et al. |
| 2,432,117 | A | 12/1947 | Morton |
| 2,488,729 | A | 11/1949 | Kooyman |
| 2,504,681 | A | 4/1950 | Hall |
| 2,516,114 | A | 7/1950 | Green |
| 2,601,517 | A | 6/1952 | Hammes |

(Continued)

FOREIGN PATENT DOCUMENTS

CA  1038918  9/1978

(Continued)

OTHER PUBLICATIONS

International Search Report for PCT/CA2007/001040, mailed Sep. 28, 2007.

(Continued)

*Primary Examiner* — Tran Nguyen
(74) *Attorney, Agent, or Firm* — Seed IP Law Group PLLC

(57) ABSTRACT

A polyphasic multi-coil generator includes a drive shaft, at least first and second rotors rigidly mounted on the drive shaft so as to simultaneously synchronously rotate with rotation of the drive shaft, and at least one stator sandwiched between the first and second rotors. A stator array on the stator has an array of electrically conductive coils mounted to the stator in a first angular orientation about the drive shaft. The rotors each have an array of magnets which are circumferentially equally spaced around the rotor and located at the same radially spacing with respect to the centre of the rotor and the drive shaft at a first angular orientation relative to the drive shaft. The arrays of magnets on adjacent rotors are off-set by an angular offset relative to one another.

23 Claims, 18 Drawing Sheets

U.S. PATENT DOCUMENTS

| | | | |
|---|---|---|---|
| 2,680,822 A | 6/1954 | Brainard | |
| 2,719,931 A | 10/1955 | Kober | |
| 3,083,311 A | 3/1963 | Krasnow | |
| 3,149,256 A | 9/1964 | Kohlhagen | |
| 3,153,157 A | 10/1964 | Rabe et al. | |
| 3,169,203 A | 2/1965 | Lavin et al. | |
| 3,223,865 A | 12/1965 | Gladstone | |
| 3,237,034 A | 2/1966 | Krasnow | |
| 3,293,470 A | 12/1966 | Polgreen | |
| 3,411,027 A | 11/1968 | Rosenberg et al. | |
| 3,482,156 A | 12/1969 | Porath | |
| 3,549,925 A | 12/1970 | Johnson et al. | |
| 3,621,370 A | 11/1971 | Vandervort | |
| 3,713,015 A | 1/1973 | Frister | |
| 3,801,844 A | 4/1974 | Steele | |
| 3,809,936 A | 5/1974 | Klein | |
| 3,903,863 A | 9/1975 | Katsumata | |
| 3,942,913 A | 3/1976 | Bokelman | |
| 3,944,855 A | 3/1976 | Le Van | |
| 3,965,669 A | 6/1976 | Larson et al. | |
| 3,973,137 A * | 8/1976 | Drobina | 310/114 |
| 3,973,501 A | 8/1976 | Briggs | |
| 3,992,641 A | 11/1976 | Heinrich et al. | |
| 4,001,887 A | 1/1977 | Platt et al. | |
| 4,004,426 A | 1/1977 | Laing | |
| 4,013,937 A | 3/1977 | Pelly et al. | |
| 4,015,174 A | 3/1977 | Cotton de Bennetot | |
| 4,020,369 A | 4/1977 | Shoupp et al. | |
| 4,023,751 A | 5/1977 | Richard | |
| 4,039,848 A | 8/1977 | Winderl | |
| 4,050,295 A | 9/1977 | Harvey | |
| 4,051,402 A | 9/1977 | Gruber | |
| 4,074,159 A | 2/1978 | Robison | |
| 4,074,180 A | 2/1978 | Sharpe et al. | |
| 4,095,922 A | 6/1978 | Farr | |
| 4,100,743 A | 7/1978 | Trumbull et al. | |
| 4,107,987 A | 8/1978 | Robbins et al. | |
| 4,126,933 A | 11/1978 | Anderson et al. | |
| 4,141,331 A | 2/1979 | Mallory, Jr. | |
| 4,142,696 A | 3/1979 | Nottingham | |
| 4,151,051 A | 4/1979 | Evans | |
| 4,155,252 A | 5/1979 | Morrill | |
| 4,168,459 A | 9/1979 | Roesel, Jr. | |
| 4,179,633 A | 12/1979 | Kelly | |
| 4,181,468 A | 1/1980 | Kent et al. | |
| 4,187,441 A * | 2/1980 | Oney | 310/112 |
| 4,191,893 A | 3/1980 | Grana et al. | |
| 4,196,572 A | 4/1980 | Hunt | |
| 4,203,710 A | 5/1980 | Farr | |
| 4,215,426 A | 7/1980 | Klatt | |
| 4,237,391 A | 12/1980 | Schur et al. | |
| 4,245,601 A | 1/1981 | Crowder | |
| 4,246,490 A | 1/1981 | Keramati et al. | |
| 4,247,785 A | 1/1981 | Apgar | |
| 4,253,031 A | 2/1981 | Frister | |
| 4,254,344 A | 3/1981 | Fancy et al. | |
| 4,260,901 A | 4/1981 | Woodbridge | |
| 4,261,312 A | 4/1981 | Hart | |
| 4,261,562 A | 4/1981 | Flavell | |
| 4,276,481 A | 6/1981 | Parker | |
| 4,286,581 A | 9/1981 | Atkinson, Jr. | |
| 4,289,970 A | 9/1981 | Deibert | |
| 4,291,235 A | 9/1981 | Bergey, Jr. et al. | |
| 4,297,604 A | 10/1981 | Tawse | |
| 4,302,683 A | 11/1981 | Burton | |
| 4,305,031 A | 12/1981 | Wharton | |
| 4,308,479 A | 12/1981 | Richter | |
| 4,316,096 A | 2/1982 | Syverson | |
| 4,317,437 A | 3/1982 | Lindgren | |
| 4,322,667 A | 3/1982 | Ohba | |
| 4,329,138 A | 5/1982 | Riordan | |
| 4,339,704 A * | 7/1982 | McSparran et al. | 322/90 |
| 4,340,822 A | 7/1982 | Gregg | |
| 4,355,276 A | 10/1982 | Vittay | |
| 4,358,693 A | 11/1982 | Palmer et al. | |
| 4,364,005 A | 12/1982 | Kohzai et al. | |
| 4,373,488 A | 2/1983 | Neuhalfen | |
| 4,385,246 A | 5/1983 | Schur et al. | |
| 4,402,524 A | 9/1983 | D'Antonio et al. | |
| 4,406,950 A | 9/1983 | Roesel, Jr. | |
| 4,412,170 A | 10/1983 | Roesel, Jr. | |
| 4,419,617 A | 12/1983 | Reitz | |
| 4,433,280 A | 2/1984 | Lindgren | |
| 4,433,355 A | 2/1984 | Chew et al. | |
| 4,434,617 A | 3/1984 | Walsh | |
| 4,444,444 A | 4/1984 | Benedetti et al. | |
| 4,446,377 A | 5/1984 | Kure-Jensen et al. | |
| 4,454,865 A | 6/1984 | Tammen | |
| 4,456,858 A | 6/1984 | Loven | |
| 4,458,489 A | 7/1984 | Walsh | |
| 4,459,536 A | 7/1984 | Wirtz | |
| 4,473,751 A | 9/1984 | Romback et al. | |
| 4,477,745 A * | 10/1984 | Lux | 310/156.25 |
| 4,511,805 A | 4/1985 | Boy-Marcotte et al. | |
| 4,513,576 A | 4/1985 | Dibrell et al. | |
| RE31,947 E | 7/1985 | Farr | 417/313 |
| 4,532,431 A | 7/1985 | Lliev et al. | |
| 4,532,460 A | 7/1985 | Gale et al. | |
| 4,535,263 A | 8/1985 | Avery | |
| 4,536,668 A | 8/1985 | Boyer | |
| 4,539,485 A | 9/1985 | Neuenschwander | |
| 4,549,121 A | 10/1985 | Gale | |
| 4,575,671 A | 3/1986 | Lee et al. | |
| 4,578,609 A | 3/1986 | McCarty | |
| 4,581,999 A | 4/1986 | Campagnuolo et al. | |
| 4,598,240 A | 7/1986 | Gale et al. | |
| 4,599,551 A | 7/1986 | Wheatley et al. | |
| 4,601,354 A | 7/1986 | Campbell et al. | |
| 4,605,874 A | 8/1986 | Whiteley | |
| 4,628,219 A | 12/1986 | Troscinski | |
| 4,630,817 A | 12/1986 | Buckley | |
| 4,638,224 A | 1/1987 | Gritter | |
| 4,641,080 A | 2/1987 | Glennon et al. | |
| 4,642,031 A | 2/1987 | Farr | |
| 4,642,988 A | 2/1987 | Benson | |
| 4,654,066 A | 3/1987 | Garcia et al. | |
| 4,654,537 A | 3/1987 | Gaspard | |
| 4,656,379 A | 4/1987 | McCarty | |
| 4,658,166 A * | 4/1987 | Oudet | 310/156.02 |
| 4,658,346 A | 4/1987 | Templeton | |
| 4,664,685 A | 5/1987 | Young | |
| 4,668,885 A | 5/1987 | Scheller | |
| 4,674,199 A | 6/1987 | Lakic | |
| 4,678,954 A | 7/1987 | Takeda et al. | |
| 4,682,067 A | 7/1987 | Oudet | |
| 4,687,945 A | 8/1987 | Ebeling | |
| 4,692,675 A | 9/1987 | Falk | 318/254 |
| 4,698,538 A | 10/1987 | Yoshida | |
| 4,698,562 A | 10/1987 | Gale et al. | |
| 4,710,667 A | 12/1987 | Whiteley | |
| 4,713,569 A | 12/1987 | Schwartz | |
| 4,729,218 A | 3/1988 | Haselbauer et al. | |
| 4,737,070 A | 4/1988 | Horiuchi et al. | |
| 4,783,028 A | 11/1988 | Olson | |
| 4,785,228 A | 11/1988 | Goddard | |
| 4,806,812 A | 2/1989 | Masterman | |
| 4,809,510 A | 3/1989 | Gaspard et al. | |
| 4,811,091 A | 3/1989 | Morrison et al. | |
| 4,814,651 A | 3/1989 | Elris et al. | |
| 4,819,361 A | 4/1989 | Boharski | |
| 4,831,300 A | 5/1989 | Lindgren | |
| 4,835,433 A | 5/1989 | Brown | |
| 4,839,039 A | 6/1989 | Parsons et al. | |
| 4,843,270 A | 6/1989 | Dijken | |
| 4,845,749 A | 7/1989 | Brickell et al. | |
| 4,851,703 A | 7/1989 | Means | |
| 4,862,021 A | 8/1989 | LaRocca | |
| 4,864,151 A | 9/1989 | Wyczalek et al. | |
| 4,866,321 A | 9/1989 | Blanchard et al. | |
| 4,872,805 A | 10/1989 | Horiuchi et al. | |
| 4,874,346 A | 10/1989 | Wachspress | |
| 4,876,991 A | 10/1989 | Galitello, Jr. | |
| 4,879,045 A | 11/1989 | Eggerichs | |
| 4,879,484 A | 11/1989 | Huss | |
| 4,879,501 A | 11/1989 | Haner | |
| 4,884,953 A | 12/1989 | Golben | |
| 4,885,526 A | 12/1989 | Szabo | |

| | | | | | | |
|---|---|---|---|---|---|---|
| 4,893,040 A | 1/1990 | Turner et al. | | 5,614,773 A | 3/1997 | Fabris |
| 4,904,926 A | 2/1990 | Pasichinskyj | | 5,619,423 A | 4/1997 | Scrantz |
| 4,906,877 A | 3/1990 | Ciaio | | 5,625,241 A | 4/1997 | Ewing et al. |
| 4,914,412 A | 4/1990 | Engdahl et al. | | 5,626,103 A | 5/1997 | Haws et al. |
| 4,927,329 A | 5/1990 | Kliman et al. | | 5,637,934 A | 6/1997 | Fabris |
| 4,933,609 A | 6/1990 | Clark | | 5,637,935 A | 6/1997 | Haaland |
| 4,950,973 A | 8/1990 | Kouba | | 5,641,276 A * | 6/1997 | Heidelberg et al. ........ 417/423.7 |
| 4,953,052 A | 8/1990 | Cartlidge et al. | | 5,650,679 A | 7/1997 | Boggs, III et al. |
| 4,959,605 A | 9/1990 | Vaidya et al. | | 5,653,135 A | 8/1997 | Miller et al. |
| 4,963,780 A | 10/1990 | Hochstrasser | | 5,659,300 A | 8/1997 | Dresselhuys et al. |
| 4,973,868 A | 11/1990 | Wust | | 5,682,073 A | 10/1997 | Mizuno |
| 4,977,529 A | 12/1990 | Gregg et al. | | 5,689,165 A | 11/1997 | Jones et al. |
| 4,980,595 A | 12/1990 | Arora | | 5,689,175 A | 11/1997 | Hanson et al. |
| 4,985,875 A | 1/1991 | Mitchell | | 5,690,209 A | 11/1997 | Kofoed |
| 4,994,700 A | 2/1991 | Bansal et al. | | 5,696,413 A | 12/1997 | Woodbridge et al. |
| 5,002,020 A | 3/1991 | Kos | | 5,696,419 A | 12/1997 | Rakestraw et al. |
| 5,003,209 A | 3/1991 | Huss et al. | | 5,709,103 A | 1/1998 | Williams |
| 5,003,517 A | 3/1991 | Greer, Jr. | | 5,710,474 A | 1/1998 | Mulgrave |
| 5,021,698 A | 6/1991 | Pullen et al. | | 5,715,716 A | 2/1998 | Miller et al. |
| 5,030,867 A | 7/1991 | Yamada et al. | | 5,717,316 A | 2/1998 | Kawai |
| 5,043,592 A | 8/1991 | Hochstrasser | | 5,719,458 A | 2/1998 | Kawai |
| 5,043,911 A | 8/1991 | Rashid | | 5,720,194 A | 2/1998 | Miller et al. |
| 5,047,680 A | 9/1991 | Torok | | 5,726,517 A | 3/1998 | Gueraud et al. |
| 5,053,662 A | 10/1991 | Richter | | 5,731,649 A * | 3/1998 | Caamano ............... 310/216.047 |
| 5,057,726 A * | 10/1991 | Mole et al. ................... 310/67 R | | 5,735,123 A | 4/1998 | Ehrig |
| 5,058,833 A | 10/1991 | Carmouche | | 5,736,838 A | 4/1998 | Dove et al. |
| 5,072,145 A | 12/1991 | Davis et al. | | 5,744,896 A | 4/1998 | Kessinger, Jr. et al. |
| 5,117,142 A | 5/1992 | von Zweygbergk | | 5,753,989 A | 5/1998 | Syverson et al. |
| 5,120,332 A | 6/1992 | Wells | | 5,760,507 A | 6/1998 | Miller et al. |
| 5,130,595 A | 7/1992 | Arora | | 5,762,584 A | 6/1998 | Daniels |
| 5,155,375 A | 10/1992 | Holley | | 5,773,910 A | 6/1998 | Lange |
| 5,164,826 A | 11/1992 | Dalley | | 5,775,229 A | 7/1998 | Folk et al. |
| 5,174,109 A | 12/1992 | Lampe | | 5,777,413 A | 7/1998 | Nagata et al. |
| 5,184,040 A * | 2/1993 | Lim ............................. 310/114 | | 5,784,267 A | 7/1998 | Koenig et al. |
| 5,184,458 A | 2/1993 | Lampe et al. | | 5,785,137 A | 7/1998 | Reuyl |
| 5,191,256 A | 3/1993 | Reiter, Jr. et al. | | 5,793,137 A | 8/1998 | Smith |
| 5,208,498 A | 5/1993 | Hamajima | | 5,799,484 A | 9/1998 | Nims |
| 5,220,223 A | 6/1993 | Mehnert | | 5,801,454 A | 9/1998 | Leininger |
| 5,220,232 A | 6/1993 | Rigney, II et al. | | 5,806,959 A | 9/1998 | Adams et al. |
| 5,225,712 A | 7/1993 | Erdman | | 5,833,211 A | 11/1998 | Berling |
| 5,227,702 A | 7/1993 | Nahimey | | 5,833,440 A | 11/1998 | Berling |
| 5,237,815 A | 8/1993 | McArthur | | 5,838,085 A | 11/1998 | Roesel, Jr. et al. |
| 5,237,817 A | 8/1993 | Bornemisza et al. | | 5,838,138 A | 11/1998 | Henty |
| 5,258,697 A | 11/1993 | Ford et al. | | 5,839,508 A | 11/1998 | Tubel et al. |
| 5,267,129 A | 11/1993 | Anderson | | 5,844,342 A * | 12/1998 | Miyatani et al. ............... 310/114 |
| 5,281,094 A | 1/1994 | McCarty et al. | | 5,844,385 A | 12/1998 | Jones et al. |
| 5,283,488 A | 2/1994 | Ponnappan et al. | | 5,850,111 A | 12/1998 | Haaland |
| 5,289,041 A | 2/1994 | Holley | | 5,850,138 A | 12/1998 | Adams et al. |
| 5,289,072 A | 2/1994 | Lange | | 5,850,732 A | 12/1998 | Willis et al. |
| 5,317,498 A | 5/1994 | Dhyandchand et al. | | 5,867,004 A | 2/1999 | Drager et al. |
| 5,336,933 A | 8/1994 | Ernster | | 5,874,797 A | 2/1999 | Pinkerton |
| 5,346,370 A | 9/1994 | Krohn | | 5,886,450 A | 3/1999 | Kuehnle |
| 5,355,044 A | 10/1994 | Uchida et al. | | 5,889,348 A | 3/1999 | Muhlberger et al. |
| 5,369,324 A | 11/1994 | Saether | | 5,892,311 A * | 4/1999 | Hayasaka ..................... 310/166 |
| 5,370,112 A | 12/1994 | Perkins | | 5,893,343 A | 4/1999 | Rigazzi ....................... 123/46 E |
| 5,371,426 A | 12/1994 | Nagale et al. | | 5,923,111 A | 7/1999 | Eno et al. ....................... 310/156 |
| 5,397,922 A | 3/1995 | Paul et al. | | 5,939,813 A | 8/1999 | Schöb ............................ 310/254 |
| 5,400,596 A | 3/1995 | Shlien | | 5,942,829 A | 8/1999 | Huynh ............................ 310/178 |
| 5,406,186 A | 4/1995 | Fair | | 5,945,766 A * | 8/1999 | Kim et al. ..................... 310/268 |
| 5,409,435 A | 4/1995 | Daniels | | 5,968,680 A | 10/1999 | Wolfe et al. ..................... 429/13 |
| 5,413,010 A | 5/1995 | Nakanishi et al. | | 5,973,436 A | 10/1999 | Mitcham ........................ 310/266 |
| 5,427,194 A | 6/1995 | Miller | | 5,982,070 A | 11/1999 | Caamano |
| 5,433,175 A | 7/1995 | Hughes et al. | | 5,982,074 A | 11/1999 | Smith et al. |
| 5,448,123 A | 9/1995 | Nilson et al. | | 5,990,590 A | 11/1999 | Roesel, Jr. et al. ............. 310/113 |
| 5,468,378 A | 11/1995 | de la Torre Barreiro | | 5,997,252 A | 12/1999 | Miller ........................ 416/197 A |
| 5,473,205 A | 12/1995 | Haaland | | 5,998,902 A | 12/1999 | Sleder, Sr. et al. ............. 310/153 |
| 5,481,146 A | 1/1996 | Davey | | 6,002,192 A | 12/1999 | Krivospitski et al. .......... 310/266 |
| 5,484,120 A | 1/1996 | Blakeley et al. | | 6,014,015 A | 1/2000 | Thorne et al. ..................... 322/15 |
| 5,489,290 A | 2/1996 | Furnish | | 6,020,711 A | 2/2000 | Rubertus et al. ............... 318/701 |
| 5,489,810 A | 2/1996 | Ferreira et al. | | 6,027,429 A | 2/2000 | Daniels ............................... 482/5 |
| 5,496,238 A | 3/1996 | Taylor | | 6,032,459 A | 3/2000 | Skowronski ................. 60/39.511 |
| 5,504,382 A | 4/1996 | Douglass et al. | | 6,034,463 A | 3/2000 | Hansson ......................... 310/259 |
| 5,512,811 A | 4/1996 | Latos et al. | | 6,037,672 A | 3/2000 | Grewe ........................... 290/40 A |
| 5,517,822 A | 5/1996 | Haws et al. | | 6,037,696 A * | 3/2000 | Sromin et al. ................. 310/268 |
| 5,523,635 A | 6/1996 | Ferreira et al. | | 6,043,579 A | 3/2000 | Hill ................................. 310/164 |
| 5,523,637 A | 6/1996 | Miller | | 6,047,104 A | 4/2000 | Cheng ............................ 388/835 |
| 5,530,307 A | 6/1996 | Horst | | 6,055,163 A | 4/2000 | Wagner et al. .................. 363/37 |
| 5,568,005 A | 10/1996 | Davidson | | 6,057,622 A | 5/2000 | Hsu ................................. 310/191 |
| 5,594,289 A | 1/1997 | Minato | | 6,062,016 A | 5/2000 | Edelman ....................... 60/39.06 |

| Patent | Kind | Date | Inventor | Class |
|---|---|---|---|---|
| 6,064,122 | A | 5/2000 | McConnell | 290/32 |
| 6,065,281 | A | 5/2000 | Shekleton et al. | 60/39.094 |
| 6,066,898 | A | 5/2000 | Jensen | 290/52 |
| 6,066,906 | A | 5/2000 | Kalsi | 310/179 |
| 6,081,053 | A | 6/2000 | Maegawa et al. | 310/49 R |
| 6,082,112 | A | 7/2000 | Shekleton | 60/740 |
| 6,086,250 | A | 7/2000 | Rouhet et al. | 374/161 |
| 6,087,750 | A | 7/2000 | Raad | 310/152 |
| 6,093,293 | A | 7/2000 | Haag et al. | 204/298.12 |
| 6,093,986 | A | 7/2000 | Windhorn | 310/68 B |
| 6,097,104 | A | 8/2000 | Russell | 290/54 |
| 6,100,809 | A | 8/2000 | Novoselsky et al. | 340/682 |
| 6,104,097 | A | 8/2000 | Lehoczky | 290/54 |
| 6,104,115 | A | 8/2000 | Offringa et al. | 310/156 |
| 6,105,630 | A | 8/2000 | Braun et al. | 139/455 |
| 6,109,222 | A | 8/2000 | Glezer et al. | 123/46 R |
| 6,125,625 | A | 10/2000 | Lipinski et al. | 60/39.141 |
| 6,127,758 | A | 10/2000 | Murry et al. | 310/168 |
| 6,149,410 | A | 11/2000 | Cooper | 418/32 |
| 6,157,107 | A | 12/2000 | Aoshima et al. | 310/156 |
| 6,158,953 | A | 12/2000 | Lamont | 415/4.4 |
| 6,166,473 | A * | 12/2000 | Hayasaka | 310/216.096 |
| 6,169,332 | B1 | 1/2001 | Taylor et al. | 290/7 |
| 6,170,251 | B1 | 1/2001 | Skowronski et al. | 60/39.02 |
| 6,172,429 | B1 | 1/2001 | Russell | 290/54 |
| 6,172,440 | B1 | 1/2001 | Sasaki et al. | 310/156 |
| 6,175,210 | B1 | 1/2001 | Schwartz et al. | 318/801 |
| 6,177,735 | B1 | 1/2001 | Chapman et al. | 290/44 |
| 6,178,751 | B1 | 1/2001 | Shekleton et al. | 60/736 |
| 6,181,235 | B1 | 1/2001 | Smith | 340/310.01 |
| 6,189,621 | B1 | 2/2001 | Vail, III | 166/385 |
| 6,191,561 | B1 | 2/2001 | Bartel | 322/51 |
| 6,195,869 | B1 | 3/2001 | Pullen et al. | 29/598 |
| 6,198,174 | B1 | 3/2001 | Nims et al. | 290/52 |
| 6,199,381 | B1 | 3/2001 | Unger et al. | 60/520 |
| 6,199,519 | B1 | 3/2001 | Van Blarigan | 123/46 R |
| 6,211,633 | B1 | 4/2001 | Jones et al. | 318/254 |
| 6,215,206 | B1 | 4/2001 | Chitayat | 310/12 |
| 6,226,990 | B1 | 5/2001 | Conrad | 60/520 |
| 6,242,827 | B1 | 6/2001 | Wolf et al. | 310/74 |
| 6,242,840 | B1 | 6/2001 | Denk et al. | 310/254 |
| 6,244,034 | B1 | 6/2001 | Taylor et al. | 60/39.02 |
| 6,246,138 | B1 | 6/2001 | Nims | 310/90 |
| 6,255,743 | B1 | 7/2001 | Pinkerton et al. | 290/40 C |
| 6,269,639 | B1 | 8/2001 | Conrad | 60/520 |
| 6,269,640 | B1 | 8/2001 | Conrad | 60/520 |
| 6,274,945 | B1 | 8/2001 | Gilbreth et al. | 290/52 |
| 6,274,960 | B1 | 8/2001 | Sakai et al. | 310/156 |
| 6,275,012 | B1 | 8/2001 | Jabaji | 322/22 |
| 6,276,124 | B1 | 8/2001 | Soh et al. | 60/39.75 |
| 6,279,318 | B1 | 8/2001 | Conrad | 60/520 |
| 6,279,319 | B1 | 8/2001 | Conrad | 60/520 |
| 6,284,106 | B1 | 9/2001 | Haag et al. | 204/192.12 |
| 6,286,310 | B1 | 9/2001 | Conrad | 60/520 |
| 6,288,467 | B1 | 9/2001 | Lange et al. | 310/156.58 |
| 6,291,901 | B1 | 9/2001 | Ćefo | 290/1 R |
| 6,293,101 | B1 | 9/2001 | Conrad | 60/520 |
| 6,294,842 | B1 | 9/2001 | Skowronski | 290/7 |
| 6,297,977 | B1 | 10/2001 | Huggett et al. | 363/65 |
| 6,300,689 | B1 | 10/2001 | Smalser | 290/43 |
| 6,307,278 | B1 | 10/2001 | Nims et al. | 290/52 |
| 6,307,717 | B1 | 10/2001 | Jeong | 360/265.8 |
| 6,309,268 | B1 | 10/2001 | Mabru | 440/113 |
| 6,311,490 | B1 | 11/2001 | Conrad | 60/520 |
| 6,311,491 | B1 | 11/2001 | Conrad | 60/520 |
| 6,314,773 | B1 | 11/2001 | Miller et al. | 70/303 A |
| 6,332,319 | B1 | 12/2001 | Conrad | 60/520 |
| 6,336,326 | B1 | 1/2002 | Conrad | 60/520 |
| 6,339,271 | B1 | 1/2002 | Noble et al. | 310/74 |
| 6,345,666 | B1 | 2/2002 | Conrad | 165/154 |
| 6,348,683 | B1 | 2/2002 | Verghese et al. | 250/214.1 |
| 6,362,718 | B1 | 3/2002 | Patrick et al. | 336/214 |
| 6,363,706 | B1 | 4/2002 | Meister et al. | 60/39.02 |
| 6,370,928 | B1 | 4/2002 | Chies et al. | 70/278.3 |
| 6,373,162 | B1 * | 4/2002 | Liang et al. | 310/156.53 |
| 6,373,230 | B2 | 4/2002 | Jabaji | 322/28 |
| 6,380,648 | B1 | 4/2002 | Hsu | 310/67 A |
| 6,384,564 | B1 | 5/2002 | Pollock | 318/701 |
| 6,397,946 | B1 | 6/2002 | Vail, III | 166/250.01 |
| 6,405,522 | B1 | 6/2002 | Pont et al. | 60/39.06 |
| 6,407,465 | B1 | 6/2002 | Peltz et al. | 290/43 |
| 6,411,003 | B1 | 6/2002 | Sasaki et al. | 310/156.02 |
| 6,435,925 | B1 | 8/2002 | Mabru | 440/113 |
| 6,438,937 | B1 | 8/2002 | Pont et al. | 60/39.06 |
| 6,445,105 | B1 * | 9/2002 | Kliman et al. | 310/268 |
| 6,453,658 | B1 | 9/2002 | Willis et al. | 60/39.36 |
| 6,454,920 | B1 | 9/2002 | Haag et al. | 204/298.12 |
| 6,455,964 | B1 | 9/2002 | Nims | 310/90 |
| 6,455,970 | B1 | 9/2002 | Shäfer et al. | 310/179 |
| 6,463,730 | B1 | 10/2002 | Keller et al. | 60/39.24 |
| 6,467,725 | B1 | 10/2002 | Coles et al. | 244/58 |
| 6,470,933 | B1 | 10/2002 | Volpi | 152/152.1 |
| 6,479,534 | B1 | 11/2002 | Bentley et al. | 514/411 |
| 6,483,222 | B2 | 11/2002 | Pelrine et al. | 310/268 |
| 6,486,640 | B2 | 11/2002 | Adams | 322/59 |
| 6,503,056 | B2 | 1/2003 | Eccles et al. | 416/95 |
| 6,504,281 | B1 | 1/2003 | Smith et al. | 310/190 |
| 6,512,305 | B1 | 1/2003 | Pinkerton et al. | 290/52 |
| 6,518,680 | B2 | 2/2003 | McDavid, Jr. | 290/54 |
| 6,526,757 | B2 | 3/2003 | Mackay | 60/773 |
| 6,531,799 | B1 | 3/2003 | Miller | 310/114 |
| 6,538,358 | B1 | 3/2003 | Krefta et al. | 310/263 |
| 6,545,373 | B1 | 4/2003 | Andres et al. | 290/52 |
| 6,546,769 | B2 | 4/2003 | Miller et al. | 70/303 A |
| 6,548,925 | B2 | 4/2003 | Noble et al. | 310/74 |
| 6,565,243 | B1 | 5/2003 | Cheung | 362/500 |
| 6,566,764 | B2 | 5/2003 | Rebsdorf et al. | 290/44 |
| 6,579,137 | B2 | 6/2003 | Mabru | 440/113 |
| 6,590,298 | B1 | 7/2003 | Du Plessis | 290/40 C |
| 6,606,864 | B2 | 8/2003 | MacKay | 60/773 |
| 6,622,487 | B2 | 9/2003 | Jones | 60/734 |
| 6,631,080 | B2 | 10/2003 | Trimble et al. | 363/34 |
| 6,644,027 | B1 | 11/2003 | Kelly | 60/498 |
| 6,647,716 | B2 | 11/2003 | Boyd | 60/398 |
| 6,655,341 | B2 | 12/2003 | Westerbeke, Jr. | 123/196 R |
| 6,657,348 | B2 | 12/2003 | Qin et al. | 310/156.28 |
| 6,664,688 | B2 | 12/2003 | Naito et al. | 310/156.01 |
| 6,666,027 | B1 | 12/2003 | Cardenas, Jr. | 60/772 |
| 6,669,416 | B2 | 12/2003 | Klement | 409/201 |
| 6,672,413 | B2 | 1/2004 | Moore et al. | 180/9.21 |
| 6,675,583 | B2 | 1/2004 | Willis et al. | 60/779 |
| 6,677,685 | B2 | 1/2004 | Pfleger et al. | 290/40 C |
| 6,679,977 | B2 | 1/2004 | Haag et al. | 204/192.12 |
| 6,684,642 | B2 | 2/2004 | Willis et al. | 60/746 |
| 6,700,217 | B1 | 3/2004 | North et al. | 290/53 |
| 6,700,248 | B2 | 3/2004 | Long | 310/80 |
| 6,702,404 | B2 | 3/2004 | Anwar et al. | 303/152 |
| 6,703,719 | B1 | 3/2004 | McConnell | 290/52 |
| 6,710,469 | B2 | 3/2004 | McDavid, Jr. | 290/55 |
| 6,710,491 | B2 | 3/2004 | Wu et al. | 310/112 |
| 6,710,492 | B2 * | 3/2004 | Minagawa | 310/113 |
| 6,710,502 | B2 | 3/2004 | Maslov et al. | 310/254 |
| 6,713,936 | B2 | 3/2004 | Lee | 310/257 |
| 6,717,313 | B1 | 4/2004 | Bae | 310/156.08 |
| 6,724,115 | B2 | 4/2004 | Kusase | 310/156.26 |
| 6,727,632 | B2 | 4/2004 | Kusase | 310/266 |
| 6,732,531 | B2 | 5/2004 | Dickey | 60/794 |
| 6,735,953 | B1 | 5/2004 | Wolfe et al. | 60/785 |
| 6,737,829 | B2 | 5/2004 | Sastry | 320/101 |
| 6,741,010 | B2 | 5/2004 | Wilkin | 310/268 |
| 6,756,719 | B1 | 6/2004 | Chiu | 310/257 |
| 6,759,775 | B2 | 7/2004 | Grimm | 310/156.23 |
| 6,765,307 | B2 | 7/2004 | Gerber et al. | 290/42 |
| 6,766,647 | B2 | 7/2004 | Hartzheim | 60/778 |
| 6,771,000 | B2 | 8/2004 | Kim et al. | 310/209 |
| 6,803,696 | B2 * | 10/2004 | Chen | 310/268 |
| 6,894,455 | B2 | 5/2005 | Cai et al. | |
| 6,897,595 | B1 | 5/2005 | Chiarenza | |
| 7,081,696 | B2 * | 7/2006 | Ritchey | 310/114 |
| 7,250,702 | B2 * | 7/2007 | Abou Akar et al. | 310/114 |
| 7,400,077 | B2 * | 7/2008 | Caroon | 310/266 |
| 7,595,574 | B2 * | 9/2009 | Ritchey | 310/112 |
| 2002/0047418 | A1 | 4/2002 | Seguchi et al. | 310/114 |
| 2004/0232796 | A1 | 11/2004 | Weissensteiner | |

| | | | |
|---|---|---|---|
| 2004/0251761 | A1 | 12/2004 | Hirzel |
| 2007/0182273 | A1 | 8/2007 | Burt .......................... 310/254 |
| 2010/0090553 | A1 | 4/2010 | Ritchey ...................... 310/114 |

FOREIGN PATENT DOCUMENTS

| | | | |
|---|---|---|---|
| CA | 2459126 | A1 | 4/2003 |
| JP | 54159641 | A | 12/1979 |
| JP | 57098015 | A | 6/1982 |
| JP | 2001161098 | A | 6/2001 |
| WO | 2008/091035 | A1 | 7/2008 |

OTHER PUBLICATIONS

Written Opinion of the International Searching Authority for PCT/CA2007/001040, mailed Sep. 28, 2007.

Canadian Office Action, for Canadian Application No. 2,487,668, dated Oct. 6, 2011, 4 pages.

\* cited by examiner

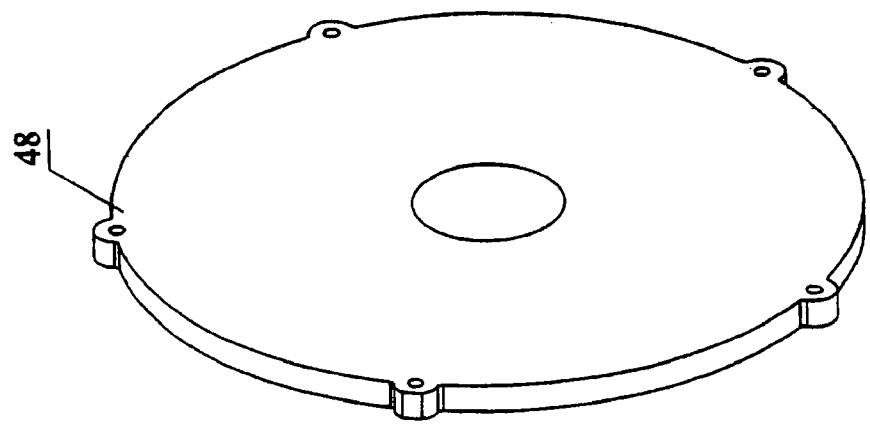
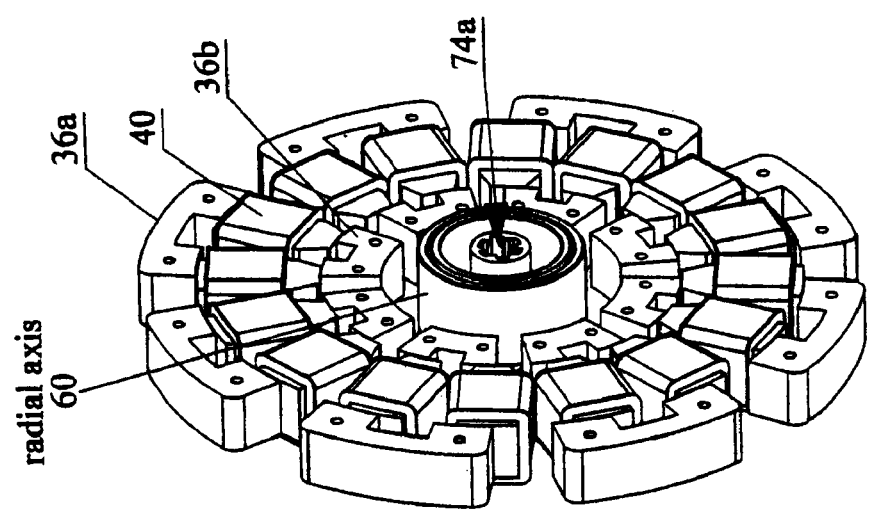
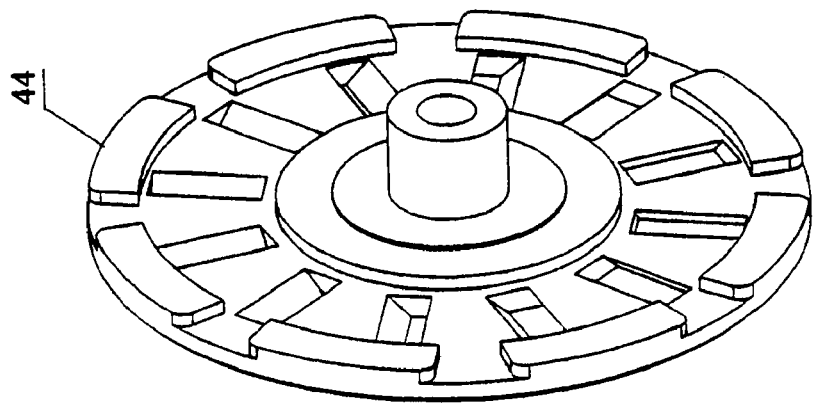
Fig 8

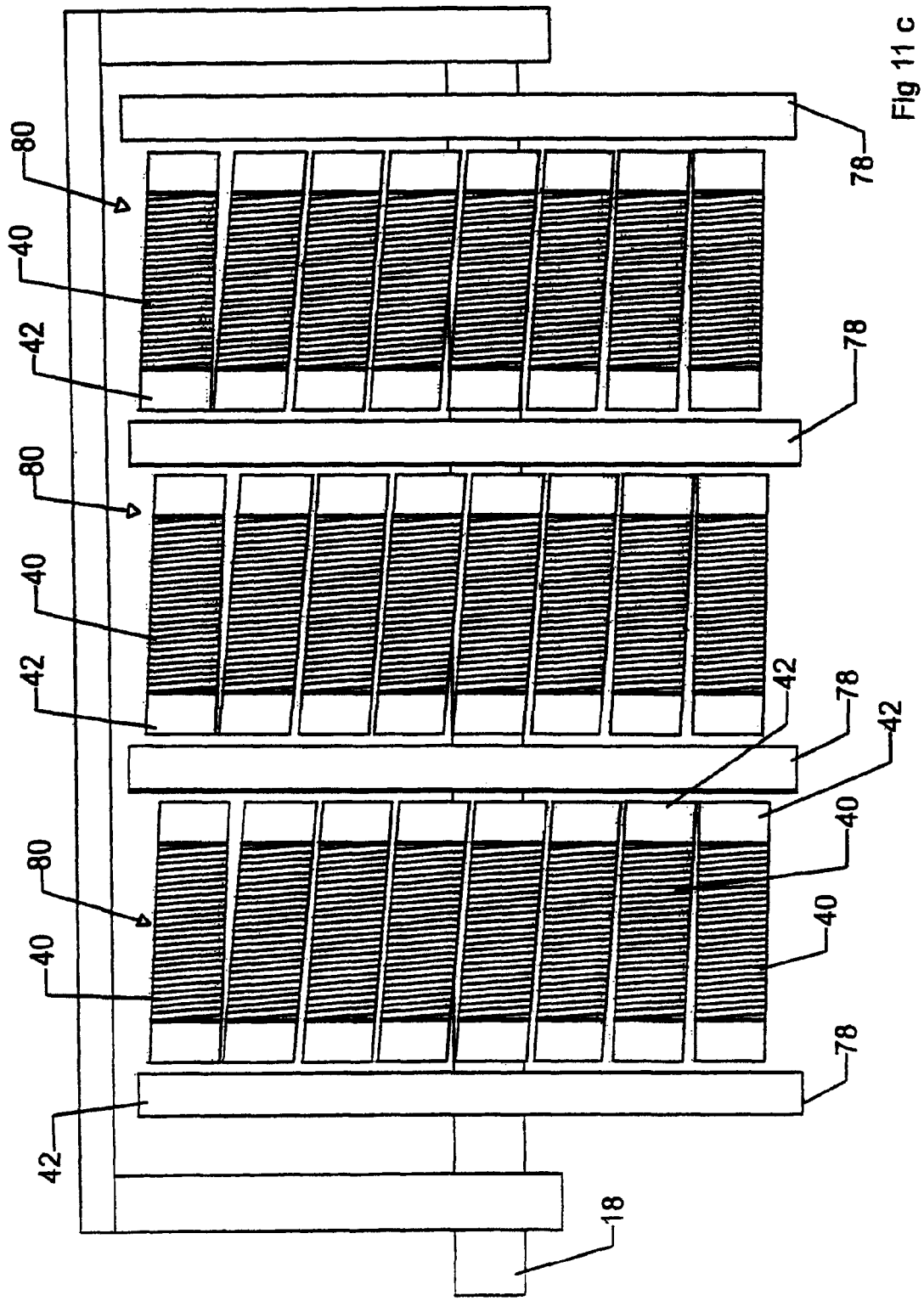

POLYPHASIC MULTI-COIL ELECTRIC DEVICE

CROSS REFERENCE TO RELATED APPLICATION

This application is a Continuation of U.S. patent application Ser. No. 11/477,493 filed on Jun. 30, 2006, which is a Continuation of U.S. Pat. No. 7,081,696 which issued on Jul. 25, 2006, which is a Continuation-in-Part of U.S. patent application Ser. No. 10/976,778 filed Nov. 1, 2004 which claims priority from U.S. Provisional patent application No. 60/600,723 filed Aug. 12, 2004 entitled Polyphasic Stationary Multi-Coil Generator.

FIELD OF THE INVENTION

The present invention relates to the field of generators, and more particularly, it relates to a generator having polyphasic multiple coils in staged staggered arrays.

BACKGROUND OF THE INVENTION

Conventional electric motors employ magnetic forces to produce either rotational or linear motion. Electric motors operate on the principle that when a conductor, which carries a current, is located in the magnetic field, a magnetic force is exerted upon the conductor resulting in movement. Conventional generators operate through the movement of magnetic fields thereby producing a current in a conductor situated within the magnetic fields. As a result of the relationship between conventional motors and generators, conventional generator technologies have focused mainly on modifying electric motor designs, for example, by reversing the operation of an electric motor.

In a conventional design for an electric motor, adding an electrical current to the coils of an induction system creates a force through the interaction of the magnetic fields and the conducting wire. The force rotates a shaft. Conventional electric generator design is the opposite. By rotating the shaft, an electric current is created in the conductor coils. However the electric current will continue to oppose the force rotating the shaft. This resistance will continue to grow as the speed of the shaft is increased, thus reducing the efficiency of the generator. In a generator where a wire is coiled around a soft iron core (ferromagnetic), a magnet may be drawn by the coil and a current will be produced in the coil wire. However, the system would not create an efficient generator due to the physical reality that it takes more energy to pull the magnet away from the soft iron core of the coil than would be created in the form of electricity by the passing of the magnet.

As a result, there is a need for a generator wherein the magnetic drag may be substantially reduced such that there is little resistance while the magnets are being drawn away from the coils. Furthermore, there is a need for a generator that minimizes the impact of the magnetic drag produced on the generator. In the prior art, Applicant is aware of U.S. Pat. No. 4,879,484 which issued to Huss on Nov. 7, 1989 for an Alternating Current Generator and Method of Angularly Adjusting the Relative Positions of Rotors Thereof. Huss describes an actuator for angularly adjusting a pair of rotors relative to each other about a common axis, the invention being described as solving a problem with voltage control as generator load varies where the output voltage of a dual permanent magnet generator is described as being controlled by shifting the two rotors in and out of phase.

Applicant also is aware of U.S. Pat. No. 4,535,263 which issued Aug. 13, 1985 to Avery for Electric D.C. Motors with a Plurality of Units, Each Including a Permanent Magnet Field Device and a Wound Armature for Producing Poles. In that reference, Avery discloses an electric motor having spaced stators enclosing respective rotors on a common shaft wherein circumferential, spaced permanent magnets are mounted on the rotors and the stator windings are angularly offset with respect to adjacent stators slots so that cogging that occurs as the magnets pass a stator slot are out of phase and thus substantially cancelled out.

Applicant is also aware of U.S. Pat. No. 4,477,745 which issued to Lux on Oct. 16, 1984 for a Disc Rotor Permanent Magnet Generator. Lux discloses mounting an array of magnets on a rotor so as to pass the magnets between inner and outer stator coils. The inner and outer stators each have a plurality of coils so that for each revolution of the rotor more magnets pass by more coils than in what are described as standard prior art generators having only an outer coil-carrying stator with fewer, more spaced apart magnets.

Applicant is also aware of U.S. Pat. No. 4,305,031 which issued Wharton on Dec. 8, 1981 for a Rotary Electrical Machine. Wharton purports to address the problem wherein a generator's use of permanent magnet rotors gives rise to difficulties in regulating output voltage under varying external load and shaft speed and so describes a servo control of the relative positions of the permanent magnets by providing a rotor having a plurality of first circumferentially spaced permanent magnet pole pieces and a plurality of second circumferentially spaced permanent magnet pole pieces, where the servo causes relative movement between the first and second pole pieces, a stator winding surrounding the rotor.

SUMMARY OF THE INVENTION

In summary, the polyphasic multi-coil generator includes a drive shaft, at least first and second rotors rigidly mounted on the drive shaft so as to simultaneously synchronously rotate with rotation of the drive shaft, and at least one stator sandwiched between the first and second rotors. The stator has an aperture through which the drive shaft is rotatably journalled. A stator array on the stator has an array of electrically conductive coils mounted to the stator in a first angular orientation about the drive shaft. The coils on the stator array are circumferentially spaced around the stator and located at the same radially spacing with respect to the centre of the stator and the drive shaft and may, without intending to be limiting be equally circumferentially spaced apart. The rotors and the stator lie in substantially parallel planes. The first and second rotors have, respectively, first and second rotor arrays. The first rotor array has a first rotor array of magnets which are circumferentially equally spaced around the first rotor and located at the same radial spacing with respect to the centre of the rotor and the drive shaft at a first angular orientation relative to the drive shaft. The second rotor array has a second array of magnets which are circumferentially equally spaced around the second rotor and located at the same radial spacing with respect to the axial centre of the second rotor at a second angular orientation relative to the drive shaft. Without intending to be limiting, the rotor arrays may be equally radially spaced apart. The first and second angular orientations are off-set by an angular offset so that the first and second rotor arrays are offset relative to one another. The radially spaced apart stator and rotor arrays may be constructed without the symmetry of their being equally radially spaced apart and still function.

The angular offset is such that, as the drive shaft and the rotors are rotated in a direction of rotation of the rotors so as to rotate relative to the stator, an attractive magnetic force of the magnets of the first rotor array attracts the magnets of the first rotor array towards corresponding next adjacent coils in the stator array which lie in the direction of rotation of the rotors so as to substantially balance with and provide a withdrawing force applied to the magnets of the second rotor array to draw the magnets of the second rotor array away from corresponding past adjacent coils in the stator array as the magnets of the second rotor array are withdrawn in the direction of rotation of the rotors away from the past adjacent coils. Similarly, as the drive shaft and the rotors are rotated in the direction of rotation of the rotors, an attractive magnetic force of the magnets of the second rotor array attracts the magnets of the second rotor array towards corresponding next adjacent coils in the stator array which lie in the direction of rotation of the rotors so as to substantially balance with and provide a withdrawing force applied to the magnets of the first rotor array to draw the magnets of the first rotor array away from corresponding past adjacent coils in the stator array as the magnets of the first rotor array are withdrawn in the direction of rotation of the rotors away from the past adjacent coils.

In one embodiment, a further stator is mounted on the drive shaft, so that the drive shaft is rotatably journalled through a drive shaft aperture in the further stator. A further stator array is mounted on the further stator. The further stator array has an angular orientation about the drive shaft which, while not intending to be limiting, may be substantially the same angular orientation as the first angular orientation of the stator array of the first stator. A third rotor is mounted on the drive shaft so as to simultaneously synchronously rotate with rotation of the first and second rotors. A third rotor array is mounted on the third rotor. The third rotor array has a third array of magnets which are circumferentially equally spaced around the third rotor and located at the same radial spacing with respect to the centre of the rotor and the drive shaft at a third angular orientation relative to the drive shaft. The third angular orientation is angularly offset for example, by the angular offset of the first and second rotor arrays so that the third rotor array is offset relative to the second rotor array by the same angular offset as between the first and second rotor arrays. The further stator and the third rotor lay in planes substantially parallel to the substantially parallel planes of the first stator and the first and second rotors. Advantageously the third rotor array is both offset by the same angular offset as between the first and second rotor arrays from the second rotor array and by twice the angular offset as between the first and second rotor arrays, that is, their angular offset multiplied by two, from the first rotor array. Thus the first, second and third rotor arrays are sequentially angularly staggered about the drive shaft.

The sequentially angularly staggered first, second and third rotors, the first stator and the further stators may be referred to as together forming a first generator stage. A plurality of such stages, that is, substantially the same as the first generator stage, may be mounted on the drive shaft. Further stages may or may not be aligned with the first stage depending upon the desired application.

The magnets in the rotor arrays may be pairs of magnets, each pair of magnets may advantageously be arranged with one magnet of the pair radially inner relative to the drive shaft and the other magnet of the pair radially outer relative to the drive shaft. This arrangement of the magnets, and depending on the relative position of the corresponding coils on the corresponding stator, provides either radial flux rotors or axial flux rotors. For example, each pair of magnets may be aligned along a common radial axis, that is, one common axis for each pair of magnets, where each radial axis extends radially outwardly of the drive shaft, and each coil in the stator array may be aligned so that the each coil is wrapped substantially symmetrically around corresponding radial axes. Thus, advantageously, the magnetic flux of the pair of magnets is orthogonally end-coupled, that is, coupled at ninety degrees to the corresponding coil as each pair of magnets are rotated past the corresponding coil.

In one embodiment not intended to be limiting, the first rotor array is at least in part co-planar with the corresponding stator array as the first rotor array is rotated past the stator array, and the second rotor array is at least in part co-planar with the corresponding stator array as the second rotor is rotated past the stator array.

The rotors may include rotor plates wherein the rotor arrays are mounted to the rotor plates, and wherein the rotor plates are mounted orthogonally onto the drive shaft. The stators may include stator plates and the stator arrays are mounted to the stator plates, and wherein the stator plates are orthogonal to the drive shaft.

The rotors may be mounted on the drive shaft by mounting means which may include clutches mounted between each of the first and second rotors and the drive shaft. In such an embodiment, the drive shaft includes means for selectively engaging each clutch in sequence along the drive shaft by selective longitudinal translation of the drive shaft by selective translation means. The clutches may be centrifugal clutches adapted for mating engagement with the drive shaft when the drive shaft is longitudinally translated by the selective translation means into a first position for mating engagement with, firstly, a first clutch for example, although not necessarily, on the first rotor and, secondly sequentially into a second position for mating engagement with also a second clutch for example on the second rotor and so on to sequentially add load to the drive shaft, for example during start-up. Thus in a three rotor stage, some or all of the rotors may have clutches between the rotors and the drive shaft. As described above, the stages may be repeated along the drive shaft.

In an alternative embodiment, the mounting means may be a rigid mounting mounted between the third rotor, each of the first and second rotors and the drive shaft. Instead of the use of clutches, the electrical windings on the rotor arrays in successive stages may be selectively electrically energized, that is, between open and closed circuits for selective windings wherein rotational resistance for rotating the drive shaft is reduced when the circuits are open and increased when the circuits are closed. Staging of the closing of the circuits for successive stator arrays, that is, in successive stages, provides for the selective gradual loading of the generator.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 8 is the rotor and stator pair of FIG. 7 in rear perspective exploded view.

FIG. 11a is in side elevation a further alternative embodiment of the generator according to the present invention wherein the stator coils are parallel to the drive shaft on a single stage.

FIG. 11b is in side elevation two stages according to the design of FIG. 11a.

FIG. 11c is, in side elevation, three stages of a further alternative embodiment wherein the stator coils are inclined relative to the drive shaft.

FIG. 13 is a cross-section view of an air coil embodiment of the induction coils in FIG. 9a.

DETAILED DESCRIPTION OF EMBODIMENT OF THE INVENTION

I incorporate herein by reference in its entirety my U.S. Provisional Patent Application No. 60/600,723 filed Aug. 12, 2004 entitled Polyphasic Stationary Multi-Coil Generator. Where any inconsistency exists between that document and this specification, for example in the definition of terms, this specification is to govern.

Figure 1:
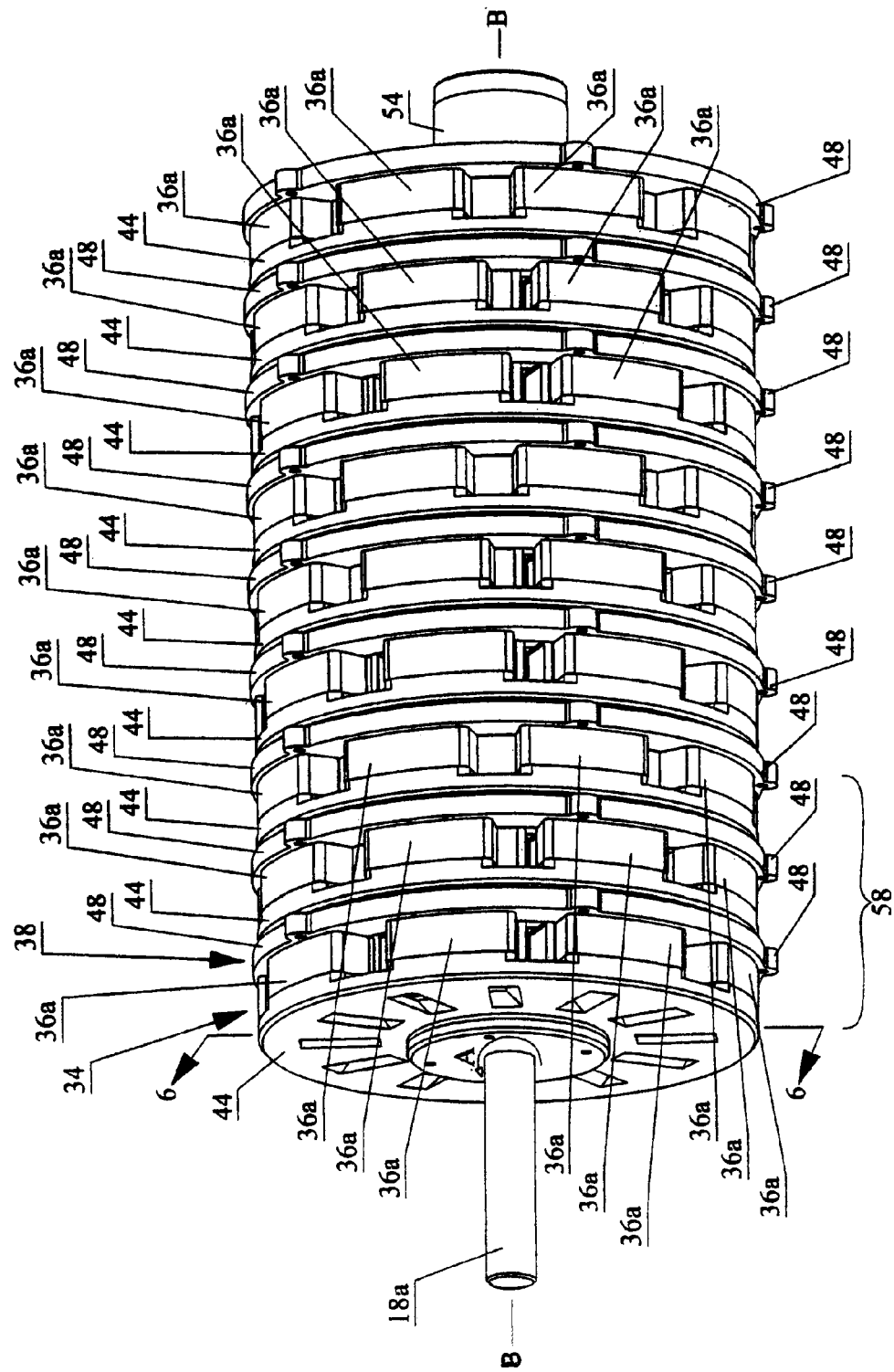
FIG. 1 is, in front perspective view, a further embodiment of the polyphasic multi-coil generator according to the present invention illustrating by way of example nine rotor and stator pairs wherein the nine pairs are grouped into three stages having three rotor and stator pairs within each stage, the radially spaced arrays of magnets on each successive rotor within a single stage staggered so as to be angularly offset with respect to each other.
Figure 1A:
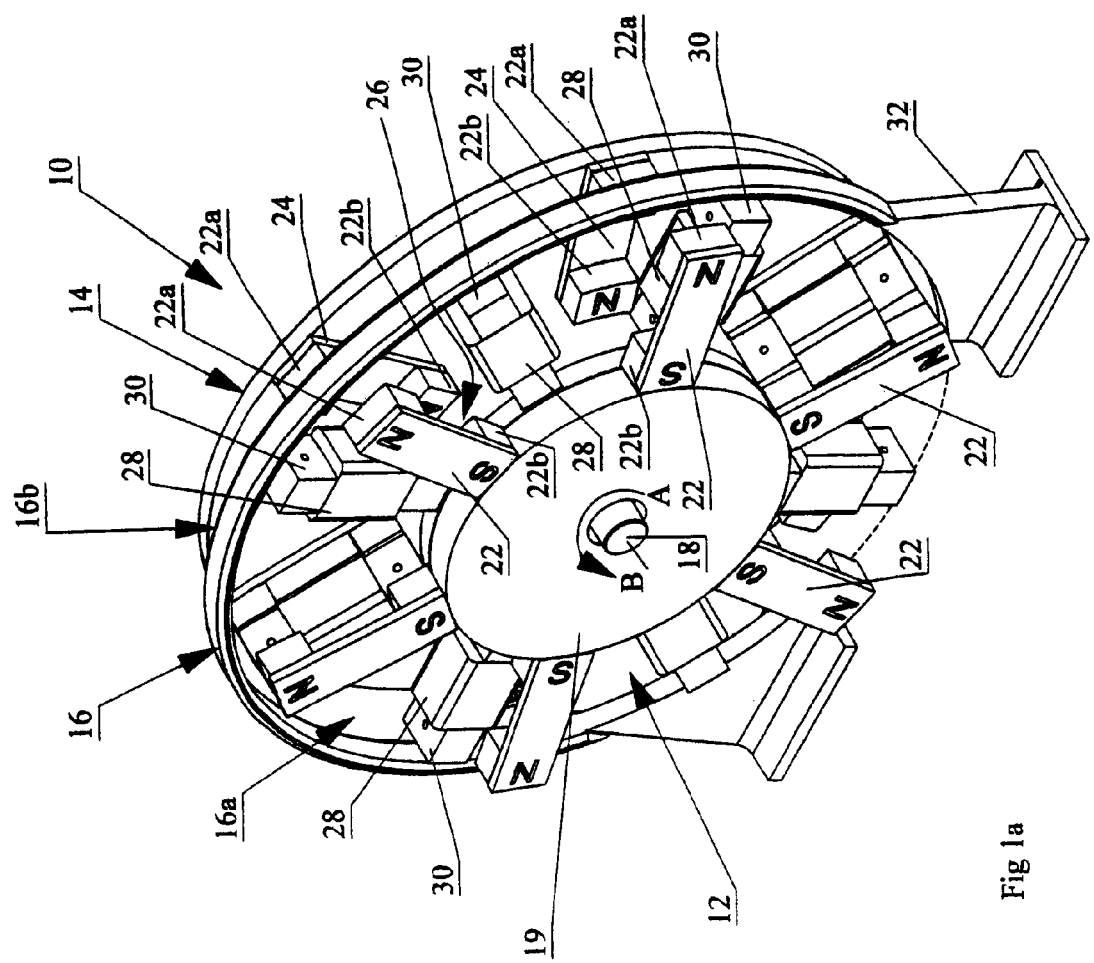
FIG. 1a is, in partially cut away perspective view, one embodiment of the polyphasic multi-coil generator showing a single stator sandwiched between opposed facing rotors.
Figure 2:
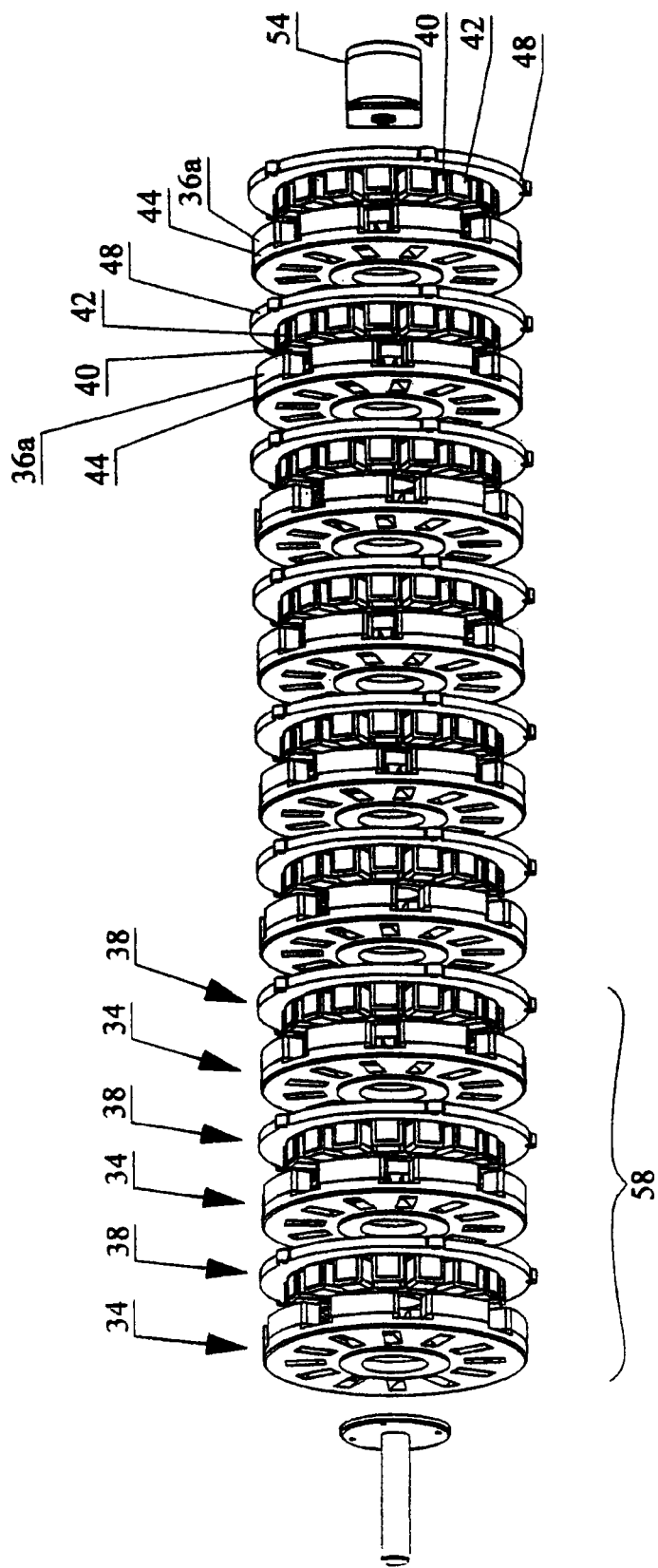
FIG. 2 is, in front perspective exploded view, the generator of FIG. 1.
Figure 3:
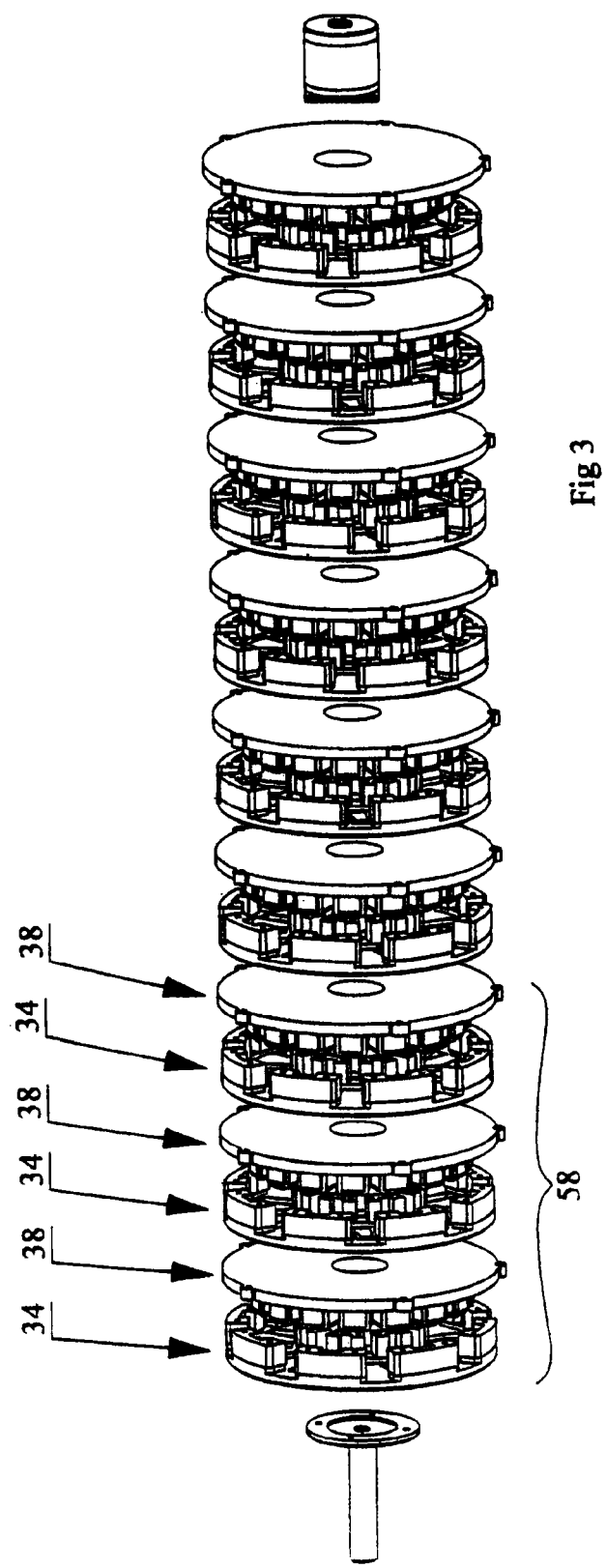
FIG. 3 is the generator of FIG. 2 in rear perspective exploded view.

In FIG. 1a, wherein like reference numerals denote corresponding parts in each view, a single stage 10 of the polyphasic multi-coil generator according to the present invention includes a pair of rotors 12 and 14 lying in parallel planes and sandwiching therebetween so as to be interleaved in a plane parallel and lying between the planes of the rotors, a stator 16. Rotors 12 and 14 are rigidly mounted to a drive shaft 18 so that when drive shaft 18 is rotated by a prime mover (not shown) for example in direction A, rotors 12 and 14 rotate simultaneously at the same rate about axis of rotation B. Feet 32 are provided to mount stator 16 down onto a base or floor surface. Rotors 12 and 14 each have a central hub 19 and mounted thereon extending in an array which is circumferentially equally spaced around the rotors and located at the same spacing with respect to the centre of the rotors and drive shaft 18 are pairs of magnets 22a and 22b. Although only one pair of magnets, that is, only two separate magnets are illustrated, with a keeper shown between to increase flux, a single magnet with the polarities of either end inducing the coils may be used with substantially equal results. Each pair of magnets is mounted on a corresponding rigid arm 24 extended cantilevered radially outwardly from hub 19. Each pair of magnets 22a and 22b are spaced apart along the length of their corresponding arm 24 so as to define a passage or channel 26 between the pair of magnets.

Electrically conductive wire coils 28 are wrapped around iron-ferrite cores 30. Cores 30 and coils 28 are mounted so as to protrude from both sides 16a and 16b of stator 16. Coils 28 are sized so as to pass snugly between the distal ends 22a and 22b of magnets 22, that is, through channel 26 so as to end couple the magnetic flux of the magnets with the ends of the coils. In the embodiment illustrated in FIG. 1a, again which is not intended to be limiting, eight coils 28 and corresponding cores 30 are mounted equally radially spaced apart around stator 16, so that an equal number of coils and cores extend from the opposite sides of stator 16 aligned so that each coil and core portion on side 16a has a corresponding coil and core immediately behind it on the opposite side of stator 16, that is, on side 16b. It is to be understood that although this embodiment employs an eight coil array, however, any number of coils with corresponding magnet assemblies may by employed. For example, in one embodiment, this design uses sixteen coils and two sets of armatures (that is rotors) with twelve sets of magnets each. This embodiment is not intended to suggest that a single stage may be employed. Any number of stages may be utilized on the same drive shaft.

Rotor 14 is a mirror image of rotor 12. Rotors 12 and 14 are mounted in opposed facing relation on opposite sides of stator 16. The angular orientation of rotors 12 and 14 about drive shaft 18 differs between the two rotors. That is, the magnets 22 on rotor 14 are angularly offset about axis of rotation B relative to the magnets mounted on rotor 12. For example, each of the pairs of magnets on rotor 14 may be angularly offset by, for example, and offset angle .alpha. (better defined below) of five degrees or ten degrees or fifteen degrees relative to the angular orientation of the pairs of magnets on rotor 12. Thus, as rotors 12 and 14 are simultaneously being driven by rotation of shaft 18, as a magnet 22 on rotor 12 is being magnetically attracted towards a next adjacent core 30 portion on side 16a of the stator, the attractive force is assisting in pushing or drawing the corresponding magnet on rotor 14 past and away from the corresponding core portion on side 16b of stator 16. Thus the attractive force of incoming magnets (incoming relative to the coil) on one rotor substantially balances the force required to push the corresponding magnets on the other rotor away from the coil/core. Consequently, any one magnet on either of the rotors is not rotated past a core merely by the force of the rotation applied to drive shaft 18, and the amount of force required to rotate the rotors relative to the stator is reduced. The efficiency of the generator is thus increased by the angular offsetting of the magnet pairs on opposite sides of the stator acting to balance or effectively cancel out the effects of the drawing of the magnets past the cores.

Further stages may be mounted onto drive shaft 18 for example further opposed facing pairs of rotors 12 and 14 having a stator 16 interleaved therebetween. In such an embodiment, further efficiency of the generator may be obtained by progressive angular offsetting of the magnets so as to angularly stagger each successive rotors' array of magnets relative to the angular orientation of the magnets on adjacent rotors. Thus, with sufficient number of stages, the magnetic forces may be relatively seamlessly balanced so that at any point during rotation of drive shaft 18, the attractive force of the magnet approaching the next adjacent cores in the direction of rotation balances the force required to push or draw the magnet pairs on other rotors away from that core thus reducing the force required to rotate drive shaft 18.

A further embodiment of the invention is illustrated in FIGS. 1-9, again wherein similar characters of reference denote corresponding parts in each view. In the illustrated embodiment nine banks of rotors 34 each have magnet pairs 36*a* and 36*b* which are circumferentially equally spaced around the rotors and located at the same radial spacing with respect to the centre of the rotors wherein the arrays are angularly displaced or staggered relative to adjacent arrays on adjacent rotors. Thus each magnet pair 36*a* and 36*b* in the equally radially spaced array of magnet pairs 36*a* and 36*b*, radially spaced about axis of rotation B are angularly offset by the same offset angle .alpha., for example, five degrees, ten degrees or fifteen degrees, between adjacent rotors. Thus the successive banks of rotors are cumulatively staggered by the same angular displacement between each successive rotor so as to achieve a more seamlessly magnetically balanced rotation of the rotors relative to the stators 38 and in particular relative to the coils 40 and cores 42 mounted on stators 38.

Magnets 36*a* and 36*b* are mounted onto a carrier plate 44. The carrier plate 44 for each rotor 34 is rigidly mounted onto drive shaft 18. Coils 40 and their corresponding cores 42 are mounted onto a stator plate 48. Stator plate 48 is rigidly mounted to housing 56, which itself may be mounted down onto a base or floor by means of rigid supports (not shown).

In one alternative embodiment not intending to be limiting, a small motor 54, which is in addition to the prime mover (not shown), may be employed to engage additional stages or banks having further progressively angularly displaced or staggered stages or banks of magnet pairs in radially spaced array on successive rotors. For example motor 54 may selectively drive a shifter rod so as to sequentially engage centrifugal clutch mechanisms on each rotor as described below.

A housing 56 may be provided to enclose stators 38 and the armatures or rotors 34. Housing 56 may be mounted on a supporting frame (not shown), and both may be made of non-magnetic and non-conductive materials to eliminate eddy currents. In one embodiment of the invention, not intended to be limiting, a single stage 58 of the generator includes three stators 38 interleaved with three rotors 34. The generator may include multiple stages 58 along the drive shaft to reduce the magnetic drag by offsetting any resistances created within the generator.

Figure 13:
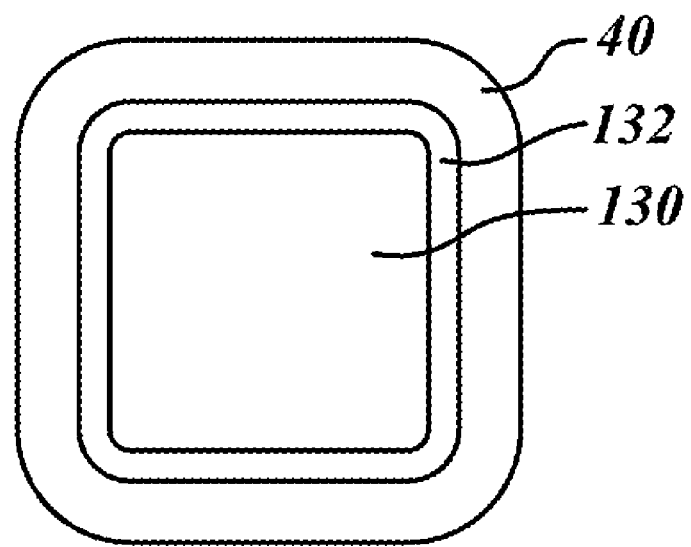

Stators 38 may include a plurality of induction coils 40 made of electrically conducting materials, such as copper wire. Each induction coil 40 may be wrapped around a highly ferromagnetic core such as a soft iron core 42. Alternatively, induction coils 40 may be air coils (that is, not wrapped around any core, for example, where coil 40 is wrapped around a solid non-ferromagnetic structure or a hollow non-ferromagnetic frame 132 in which case core 42 is replaced with air space 130 as shown in FIG. 13) for applications where less output current is required or where less mechanical force is available to be applied to rotors 38. In the illustrated embodiment of the invention, the stators are disk shaped. The embodiment of FIG. 1*a* includes eight induction coils 28 mounted equidistant and equally radially spaced apart from each other on a plate or disk made of non-magnetic and non-conductive materials. In the embodiment of the remaining figures, stators 38 include sixteen induction coils 40 on each stator disk or plate 48. The number of induction coils 40 may vary depending on the application of the generator, and may be only limited by the physical space available on the stator plate.

The induction coils 40 may be configured such that a first set of induction coils 40 produce a first independent phase signal and a second set of induction coils 40 produce a second independent phase signal with opposing wave signals. The induction coils 40 are alternately orientated such that an induction coil 40 producing the first independent phase signal is positioned in between induction coils 40 producing the second independent phase signal. In such dual phase design, the two independent phases are exact reciprocals of each other wherein one independent phase may be inverted to combine the potential current of the two into one phase with a synchronous wave pattern. Preferably, each of the first set and second set of induction coils 40 have an equal number of induction coils 40 wrapped around their cores 42 in a first direction and an equal number of induction coils 40 wrapped around their cores 42 in an opposite second direction to align the currents of the two phases. For example, in the embodiment wherein the stators 38 include sixteen, that is, two sets of eight induction coils 40 (alternate phases), each of the first set of eight induction coils 40 will produce a first independent phase signal and the second set of eight induction coils 40 will produce a second independent phase signal.

Rotors 34 may have magnets 36 of any magnetic materials such as neodymium magnets. Rotors 34 each include an array of equally spaced apart pairs of magnets 36*a* and 36*b* which are mounted on rotor plates made of non-magnetic and non-conductive materials so as to discourage straying flux lines or eddy currents. In the embodiment having sixteen induction coils 40 on each stator, the rotor array of magnets (the "rotor array") includes eight "U"-shaped opposed facing pairs of magnets 36 on each rotor 34. Each end of each "U"-shaped magnet 36, sixteen ends in all on the radially outer ring and sixteen on the inner ring, are paired to the corresponding sixteen coils as the ends of the magnets are rotated closely past the opposite ends of the coils.

Figure 4:
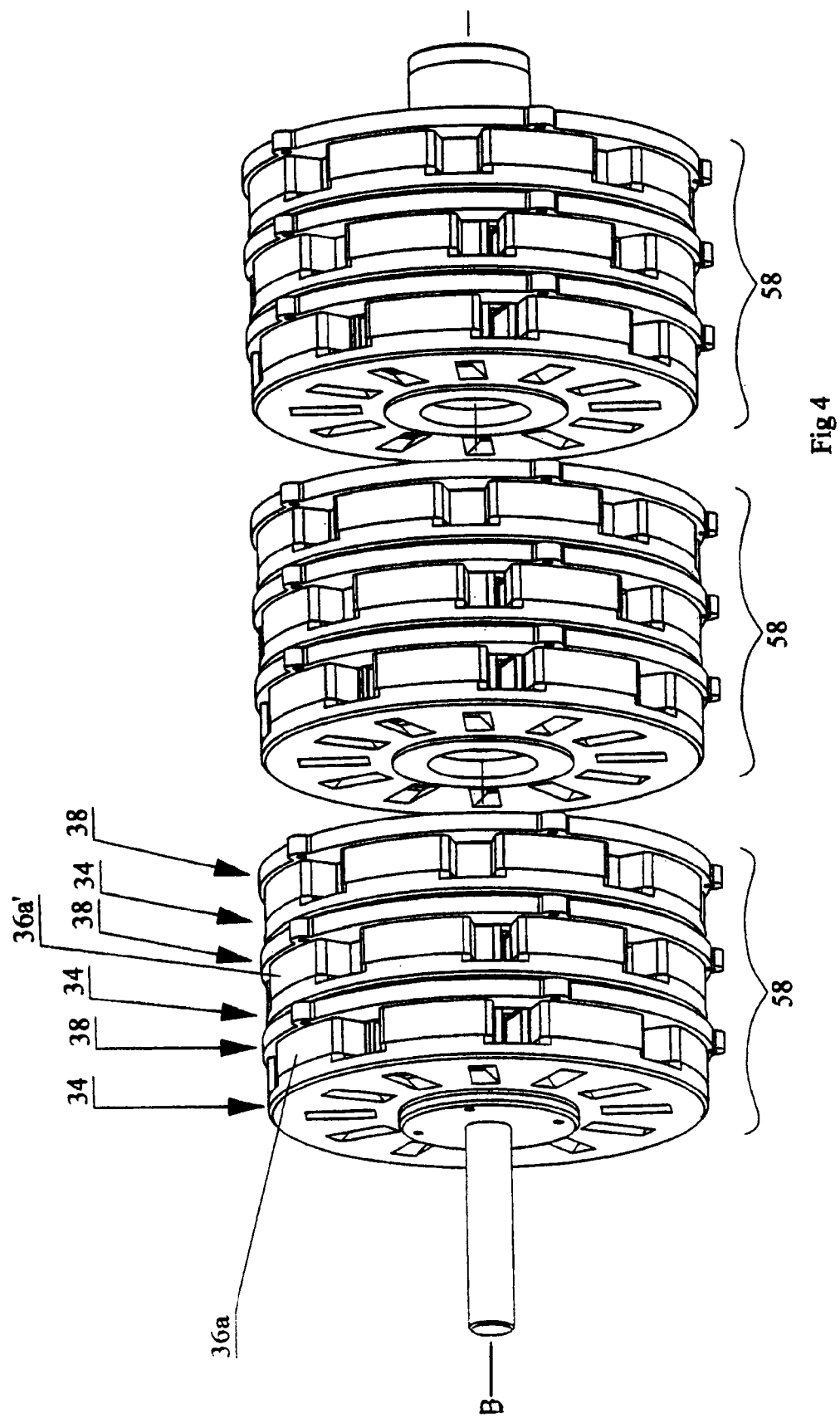
FIG. 4 is a partially exploded view of the generator of FIG. 1 illustrating the grouping of the rotor and stator pairs into three pairs per stage.
Figure 4A:
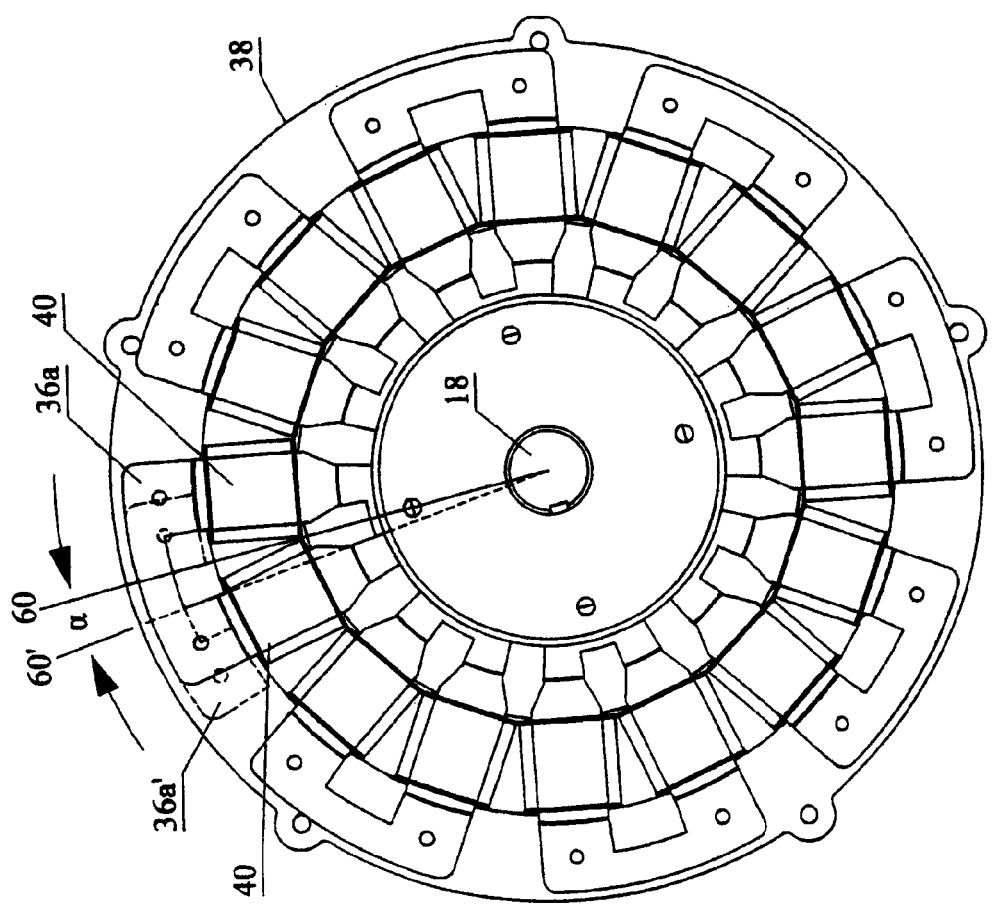
FIG. 4a is, in front elevation view, the generator of FIG. 1 with the front rotor plate removed so as to show the radially spaced apart magnet and coil arrangement.
Figure 5:
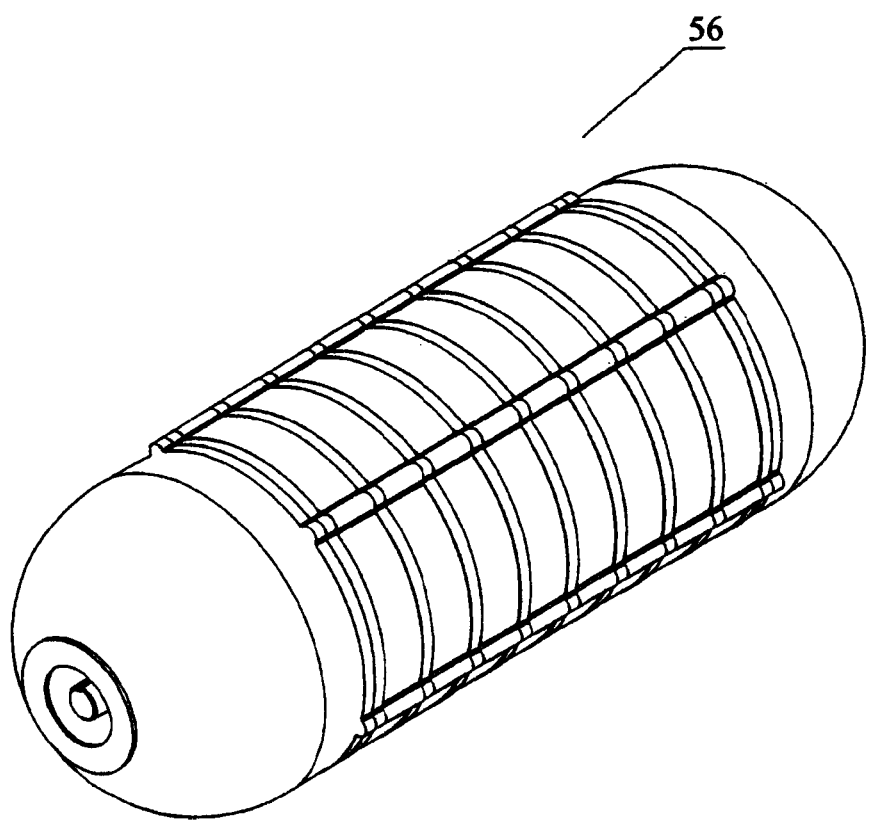
FIG. 5 is, in perspective view, the generator of FIG. 1 within a housing.
Figure 6:
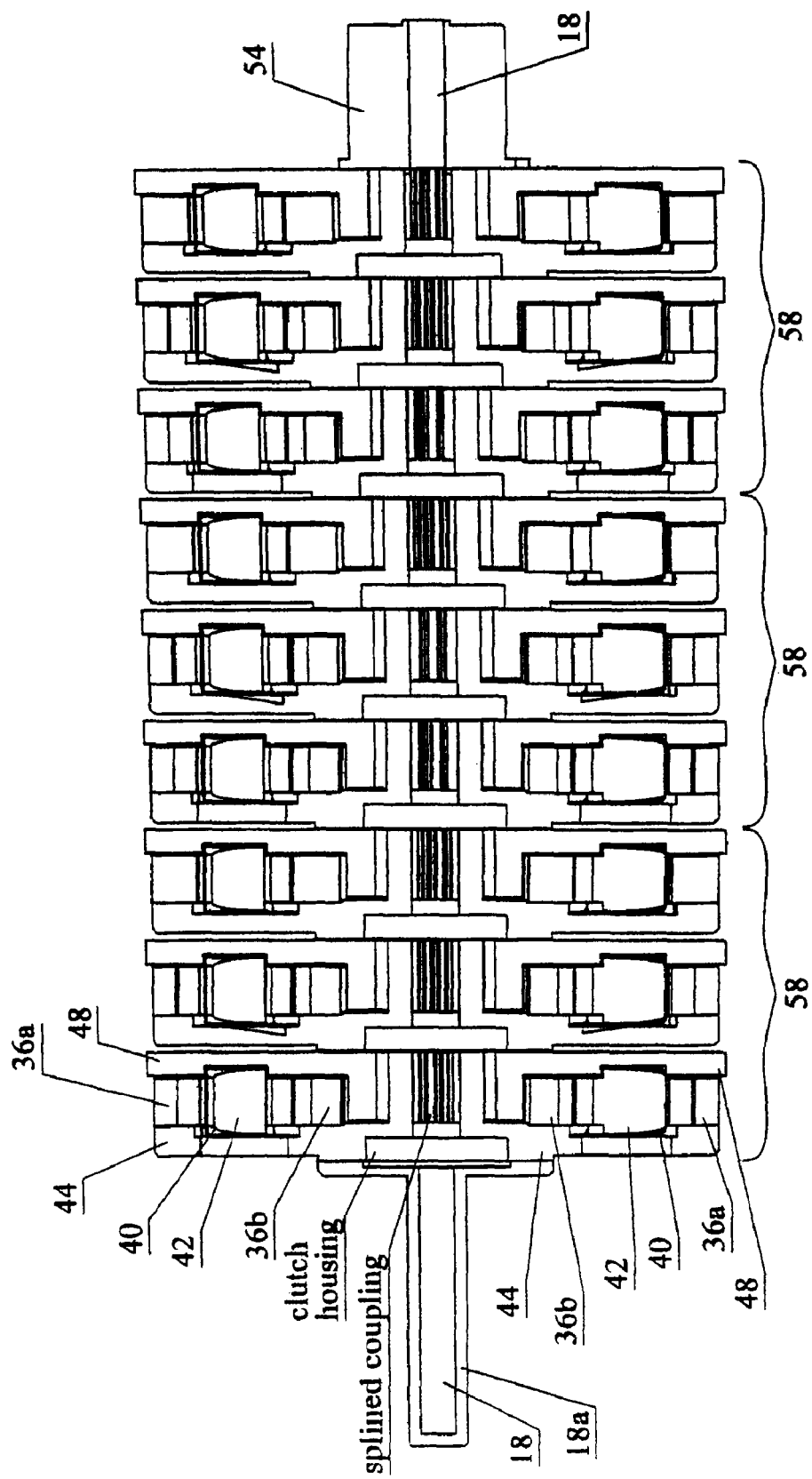
FIG. 6 is a sectional view along line 6-6 in FIG. 1.
Figure 7:
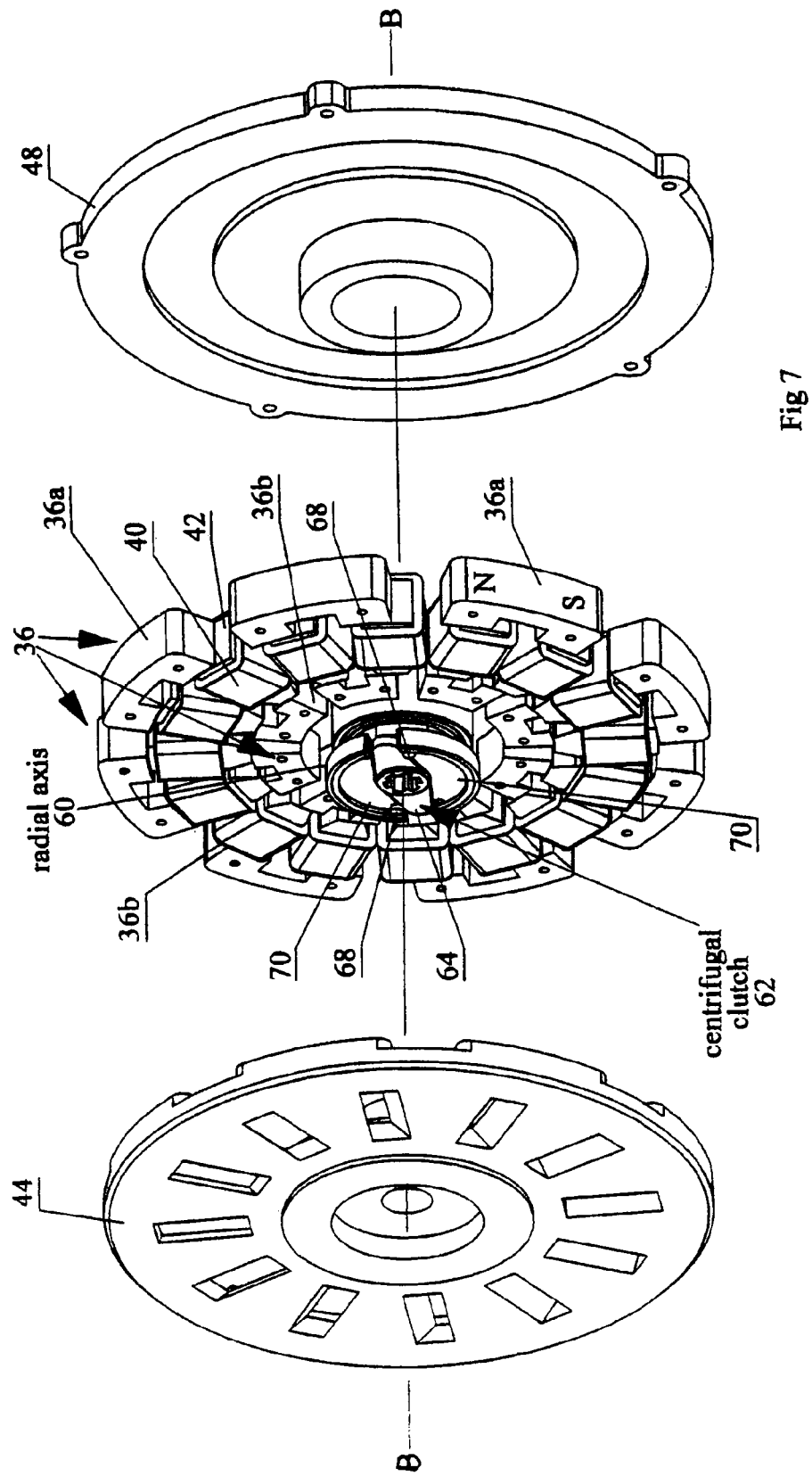
FIG. 7 is, in front perspective exploded view a single rotor and stator pair of the generator of FIG. 1.
Figure 9:
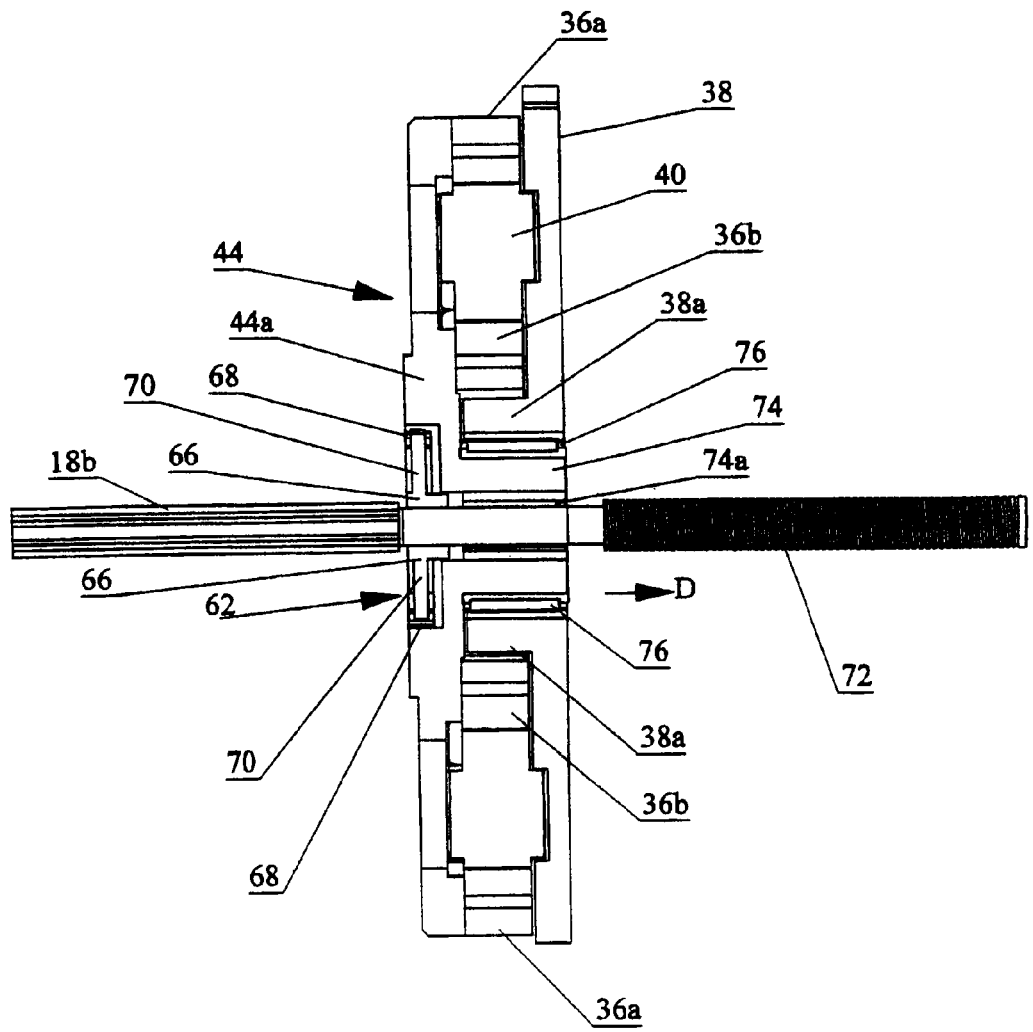
FIG. 9 is, in cross sectional view, an alternative embodiment of a single rotor and stator pair illustrating the use of a centrifugal clutch between the rotor and the drive shaft.
Figure 9A:
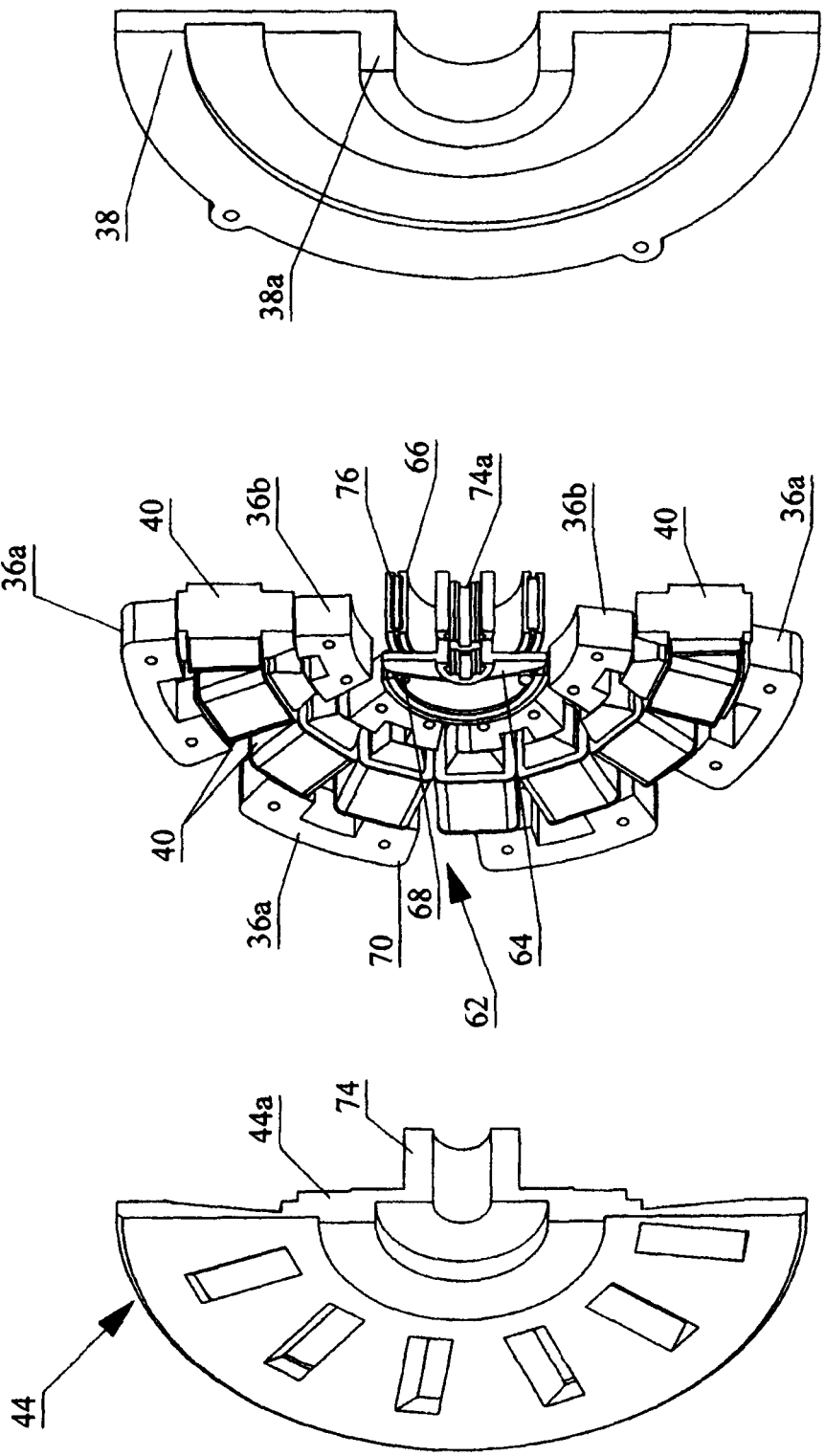
FIG. 9a is a cross sectional view through an exploded front perspective view of the rotor and stator pair of FIG. 9.

In the illustrated embodiment of FIG. 1 the rotor arrays between successive rotors 34 in stage 58 are angularly offset about the axis of rotation B of the drive shaft by an offset angle .alpha. of for example fifteen degrees. It is understood that an offset of fifteen degrees is merely one preferred offset, but it may be any number of degrees of offset. Offset angle .alpha. is seen best in FIG. 4*a* as the angle between the radial axes 60 and 60' of magnets 36*a* and 36*a'* of successive rotors 34.

As the rotors are driven to rotate about the drive shaft by an outside motive force, such as for example wind or water or other prime movers, the magnets 36 travel towards induction coils 40 by attraction of the magnets to the cores 42. AC pulse is created in all the induction coils on the stators as the induction-coils are designed to draw the magnetic flux from the magnets 36. In the embodiment of FIG. 1*a*, which is illustrative, the opposing polarity of the magnets between each rotor and the angularly offset alignment of the rotor array relative to each other permits the magnets to be drawn away from one core and towards the next core. For example, the north, south (N,S) polarity configuration of the magnets on the first rotor 12 is drawn by the opposing south, north (S,N) polarity configuration of the magnets on is the second rotor 14, where the first rotor array is offset by fifteen degrees relative to the second rotor array such that the magnetic attraction between the magnets on the first rotor and the magnets on the second rotor draws the magnets away from the core. The balancing of magnetic forces between magnets on the rotors reduces the work required from the drive shaft to draw magnets off the induction coils, thereby increasing the efficiency of the generator.

The rotating magnetic fields created by the configuration of the magnets with alternating magnetic orientation between rotors and the alternating multi phase configuration of the induction coils create multiple reciprocal AC phase signals. As the induction coils are stationary, AC power may be harnessed directly from the induction coils without brushes. The regulation and attenuation of these currents may be achieved by methods known in the art. As the magnets pass the induction coils, they induce a current that alternates in direction. Magnets may be configured such that for example an equal number of magnets influence the first set of induction coils by a N,S magnetic polarity as the number of magnets influencing the second set of induction coils by a S,N magnetic polarity. The configuration of the rotors create an alternating current in each of the two phases of the single stage embodiment of FIG. 1a. The configuration of magnetic forces allow for a balancing of the resistances within the generator.

Figure 10:
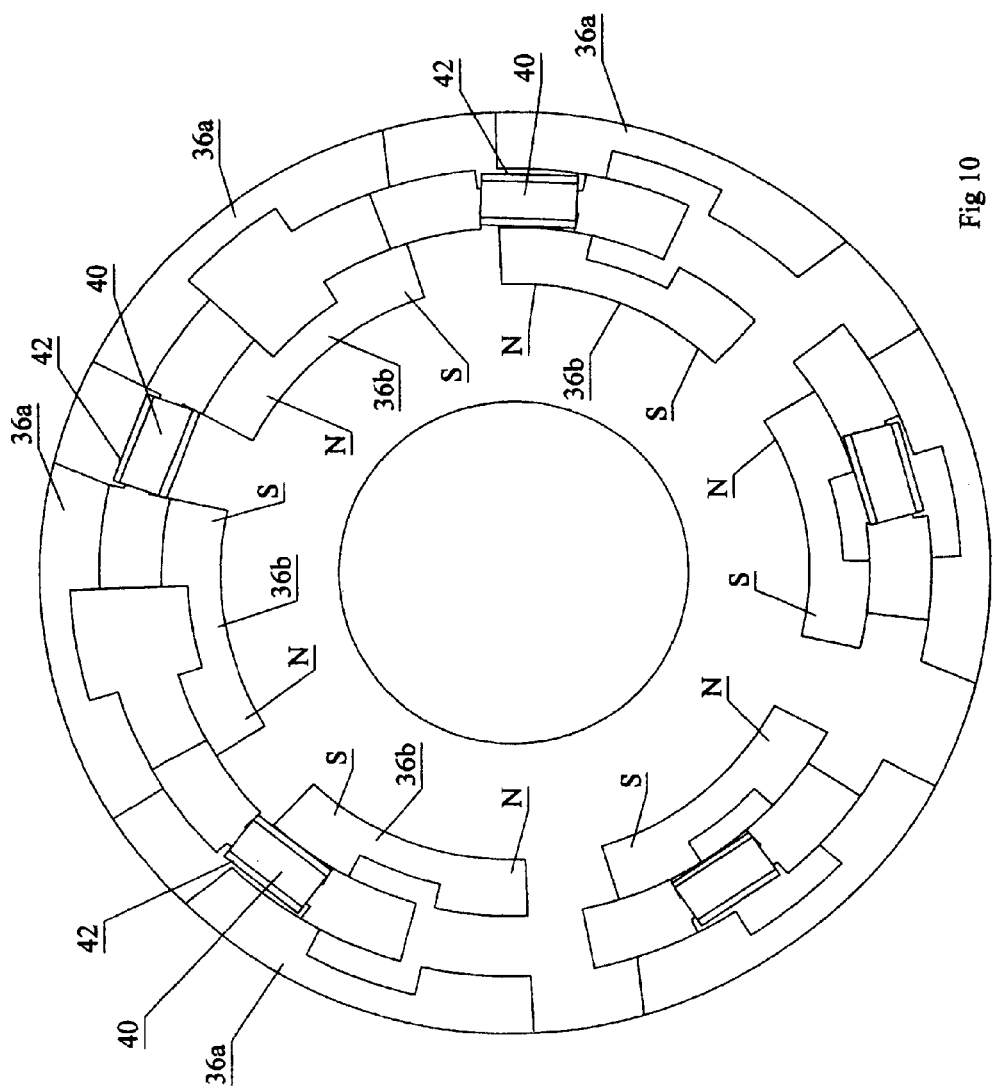
FIG. 10 is, in partially cut away front elevation view, an alternative embodiment of the present invention illustrating an alternative radially spaced apart arrangement of rotor and stator arrays.
Figure 11:
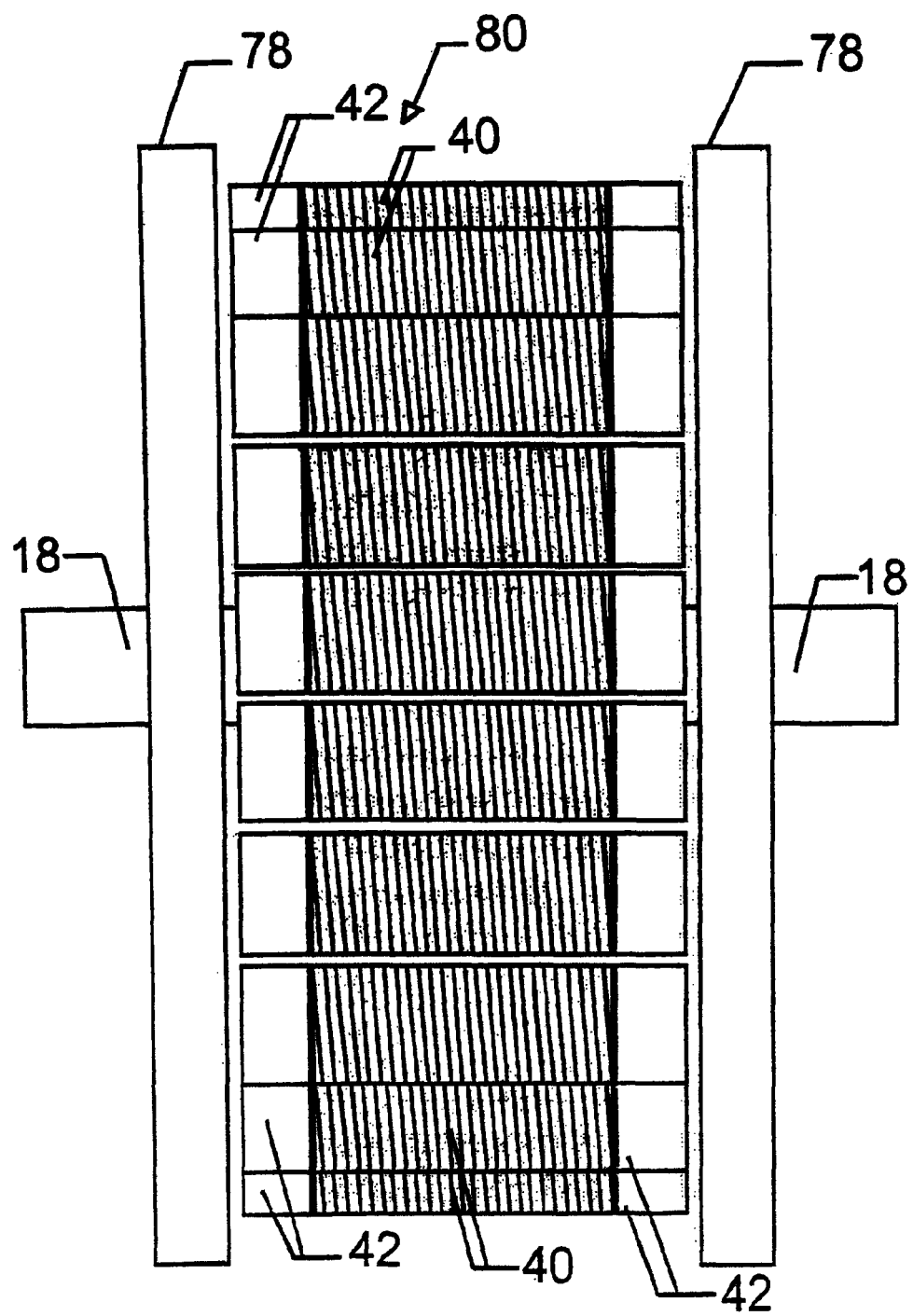
Figure 11:
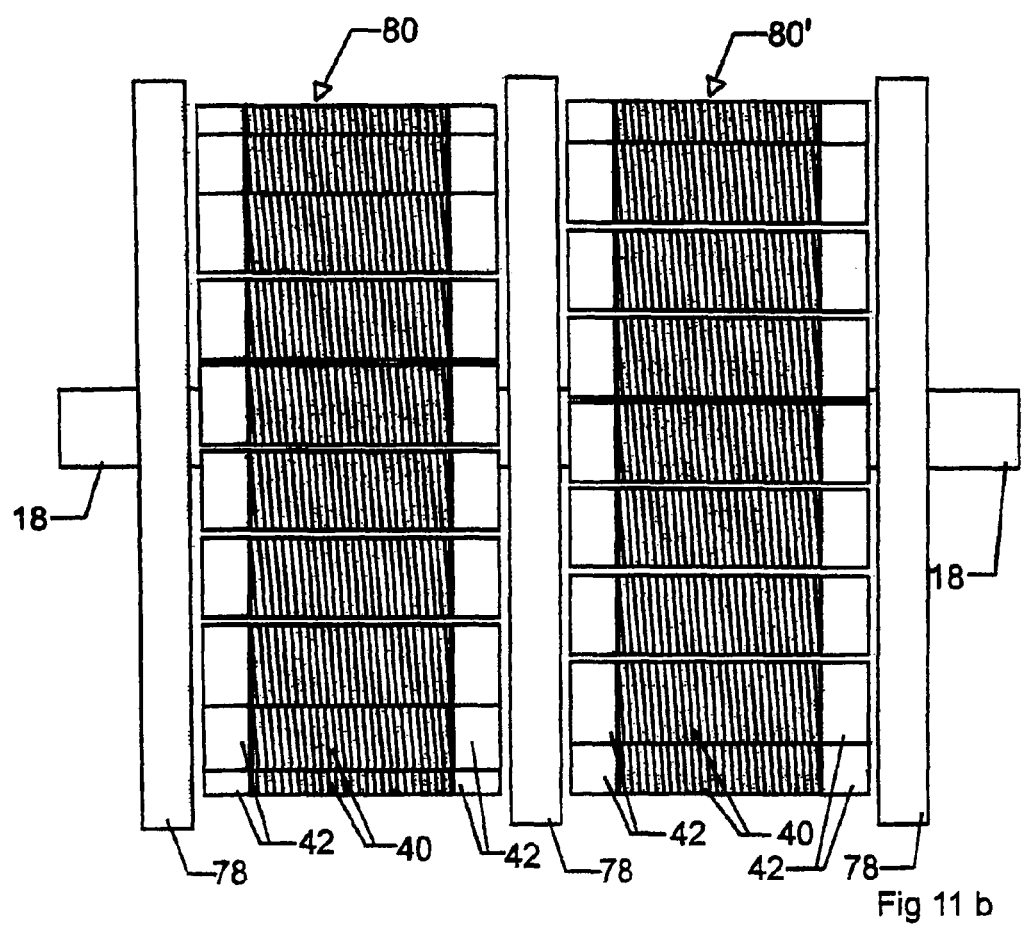

In an alternative embodiment, such as seen in FIGS. 1-9, there is a significant advantage to the addition of multiple stages on the drive shaft. The work required to rotate the drive shaft may be even further reduced through the addition of multiple stages 58. The alignment of the multiple stages may be offset such that additional stages further reduces resistance in the generator by accomplishing even greater balancing of forces than can be done with a single stage design. Alignment of stator arrays of coils ("stator arrays") may be offset or alternatively, the alignment of the rotor arrays may be offset to reduce resistance. Consequently, adding additional stages may increase electrical output without proportionally increasing resistance within the generator. While additional induction coils will increase magnetic drag, the greater balancing of forces achieved by the orientation of the stator arrays and rotor arrays of the additional stages offsets the increase in drag and further increases the overall efficiency of the generator. Additional stages may be engaged so as to rotate the additional rotors by any number of mechanisms, such as current driven sensors that use solenoids, or clutches such as the centrifugal driven clutch mechanisms of FIGS. 7-9, 9a which may be used to engage the next stage when the rotor of a subsequent stage achieves a predetermined speed. An example of a clutch is illustrated. Clutch 62 is mounted within the hub of each of rotors 34. Rotation of a clutch arm 64, once the clutch is engaged by the splines on the splined portion 18b of drive shaft 18 engaging matching splines within the arm hub 66, drives the arm against stops 68. This drives the clutch shoes 70 radially outwardly so as to engage the periphery of the shoes against the interior surface of the rotor carrier plate hub 44a. A linear actuator, for example such as motor 54, actuates shifter rod 72 in direction D so as to engage splined portion 18b with firstly, the splines within the arm hub 66. Then, once the clutch engages and the rotor comes up to nearly match the rotational speed of the drive shaft, the splined portion is further translated so as to engage the splines 74a within the rotor hub 74. Subsequent rotor/stator pairs or subsequent stages, such as stages 58, may be added, by further translation of the shifter rod into the splines of subsequent clutches and their corresponding rotor hubs. In a reversal of this process, stages are removed by withdrawing the shifter rod. Rotor hubs are supported by needle bearings 76 within stator hub 38a. In the further alternative, linear motor driven mechanisms or spline and spring mechanisms may be used. FIG. 10 is a further alternative embodiment wherein the coils are offset in a concentric circle around the drive shaft to achieve the magnetic balancing. The coils are aligned end to end in a concentric circle around the drive shaft in the further alternative embodiment seen in FIGS. 11a-11c. The induction coils 40 are mounted parallel, or slightly inclined as in FIG. 11c, relative to the drive shaft to reduce the draw of magnetic flux from between the rotors due to the close proximity and the strength of the magnets. A further advantage of positioning the induction coils parallel to the drive shaft is that drawing magnets directly past the end of each induction coil rather than from the side may be more efficient in inducing current in the induction coils. A horizontal orientation of the induction coils may also permit doubling the number of induction coils in the generator, resulting in greater output. In the embodiment of FIG. 11b, the two stator arrays 80 and 80' have an angular offset relative to each other that is one half of the desired total angular offset, that is, the alignment that provides for optimum balance. The next successive stator array may then have the same angular offset as between stator arrays 80 and 80'. As in the other embodiments the angular offset may be appropriately offset for any number of stages. This embodiment shows that the coils may be offset while leaving the magnet arrays in the armatures/rotors in alignment, that is without an angular offset between successive rotor arrays, and still accomplish the balancing effect.

As stated above, multiple stages reduce resistance as each stage is added. For example, within a stage having three rotor/stator pairs, rather than a single induction coil being induced by the passing of two magnets with opposing magnetic poles, such an embodiment allows two induction coils to effectively align between the magnetic influences of the rotor arrays. In addition to increasing the number of induction coils, the rotors arrays are much further apart, thus significantly reducing the incidence of straying magnetic flux across the space between the rotors.

To appropriately orientate additional stages for a staging application, the rotor arrays may be appropriately angularly offset as described above. Alternatively as seen in FIG. 11c, the induction coils may be angled such that the rotor arrays are not perfectly aligned in parallel to each other. As induction coils 40 and their corresponding cores 42 are on a slight angle, magnets (not shown) on rotors 78 on either side of the stator arrays 80 are preferably misaligned too as the magnetic influence from the magnets should induce each of the induction coils from both ends simultaneously for optimum function. In an embodiment of the invention, the misalignment of rotor arrays is increasingly smaller, becoming negligible as more stages are added. As additional stages are added, the less of an angular offset exists between the subsequent rotor arrays with the stages. Any number on of stages may be added to the drive shaft and additional stages may be aligned or misaligned with other stages within the generator, depending on the desired function.

The optimum number of stages may be determined by the degrees of offset of each stage relative to the previous stage. The number of induction coils in the stator arrays need not depend on the corresponding number of magnets in the rotor arrays. The stator arrays may include any number of induction coils and they may or may not be symmetrical in their placement about the stators.

Figure 12A:
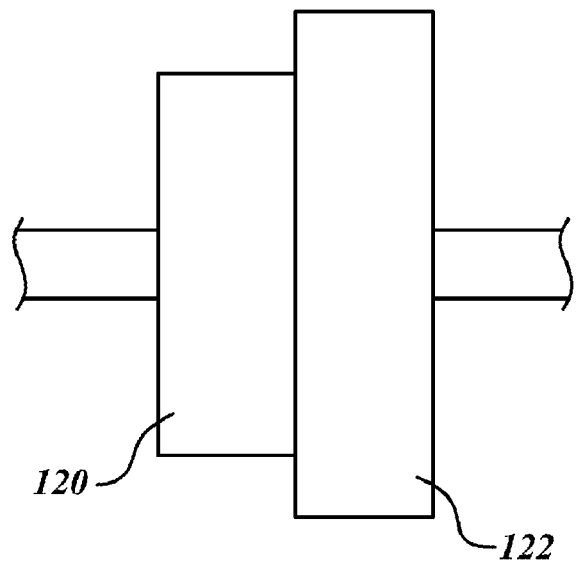
FIGS. 12a and 12b are schematic side elevation views of first and second device stages having different diameters.
Figure 12B:
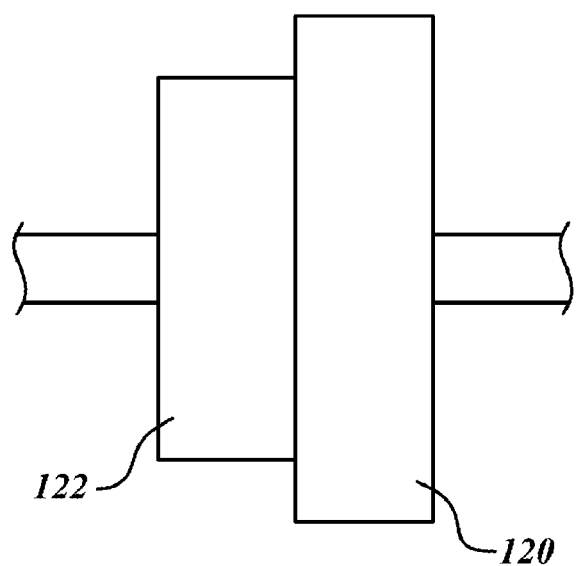

There are many applications for a generator according to the present invention. For example, rather than having a wind turbine that requires significant energy to start rotating drive shaft 18 and which may be overloaded when too much wind is applied, the generator may be reconfigured to allow the maximum current to be produced regardless of how much wind is driving the generator. This may be accomplished by engaging a greater number of stages, such as stages 58, for example, as the wind increases and decreasing the engagement of stages to reduce the number of engaged stages when the wind decreases. Furthermore, the first stage of the generator may include air coils such that very little wind energy is required to start rotating the drive shaft, and subsequent stages may include induction coils having iron cores such that greater currents may be generated when there is greater wind energy. Further, additional stages may increase in size and diameter (e.g., as illustrated by stage 120 without air coils and stage 122 with air coils in FIGS. 12a and 12b) so as to create greater physical resistance when greater wind energy is present but as well to create more electrical output from the system when input energy is high. When wind energy is minimal, the generator may thus still allow for rotor 30 to rotate as it will engage only one, that is the first stage of the generator. As the wind energy increases, the generator may engage additional stages, thus increasing the output current. As wind energy continues to increase, more stages may be added or engaged to allow for the maximum current to be drawn off the generator. As wind energy decreases in intensity, the generator may disengage the additional stages and thus reduce mechanical resistance, allowing the blades of the wind turbine or other wind driven mechanism to continue to turn regardless of how much wind is present above a low threshold. This generator configuration allows for maximized energy collection.

Applications for such a variable load generator are numerous as the generator is not only able to adapt to variable source energies, such as wind, but can be adapted to service specific power needs when source energy can be controlled. One example would be a hydro powered generator that rather than turning off at night, and needing to warm up again to service greater power needs in the day, may simply vary its output to suit the night cycle and thus use less source energy to function during that time.

In an alternative design, all of the rotors in all of the stages are rigidly mounted to the drive shaft, so that all of the rotors are rotating simultaneously. Instead of clutches, the windings circuits are left open on, at least initially, many or most of the stages to reduce turning resistance, and only those windings on the stages to be engaged are closed, that is energized. This allows for reduced resistance on the drive shaft overall when a lesser number of stages are electrically engaged. As additional circuits are closed and more windings thus added to the system, this will result in increasing the load of the generator and thus it will increase resistance on the drive shaft. By not requiring clutching mechanisms, the generator may be less expensive to construct and maintain as there are no maintenance issues regarding any clutch mechanisms. This "electrical" staging system may be applied to the magnetically balanced generator design according to the present invention or any other conventional design applicable for the staging application.

It should also be noted that the staging application, mechanical with clutches, or electrical by engaging and disengaging coil array circuitry may be applied to existing generator designs that are appropriately constructed into short, stout sections so as to accommodate the staging application.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A polyphasic multi-coil electric device comprising:
a drive shaft;
a first rotor rotatable with said drive shaft and comprising a first array of circumferentially spaced magnets coupled to said first rotor;
a second rotor rotatable with said drive shaft and comprising a second array of circumferentially spaced magnets coupled to said second rotor, wherein when said first rotor and said second rotor rotate with said drive shaft, said first array of magnets is angularly offset in a drive shaft rotation direction from said second array of magnets; and
first and second stators interleaved with said first rotor and said second rotor, each of said first and second stators comprising an aperture that receives said drive shaft, said first stator further comprising circumferentially spaced electrically conductive coils coupled to said first stator, said second stator further comprising circumferentially spaced air coils coupled to said second stator, and each of said first and second rotors and first and second stators provided in substantially parallel planes.

2. The polyphasic multi-coil electric device of claim 1, further comprising:
a third rotor rotatable with said drive shaft, said third rotor comprising a third array of circumferentially spaced magnets coupled to said third rotor, wherein when said first rotor, said second rotor and said third rotor rotate with said drive shaft, said third array of magnets is angularly offset in a drive shaft rotation direction from said first array of magnets and said second array of magnets; and
a third stator comprising an aperture that receives said drive shaft, said third stator further comprising circumferentially spaced electrically conductive coils coupled to said third stator, said third rotor and said third stator provided in substantially parallel planes.

3. The polyphasic multi-coil electric device of claim 1, further comprising:
a third rotor rotatable with said drive shaft, said third rotor comprising a third array of circumferentially spaced magnets coupled to said third rotor, wherein when said first rotor, said second rotor and said third rotor rotate with said drive shaft, said third array of magnets is angularly offset in a drive shaft rotation direction from said first array of magnets and said second array of magnets; and
a third stator comprising an aperture that receives said drive shaft, said third stator further comprising circumferentially spaced air coils coupled to said third stator, said third rotor and said third stator provided in substantially parallel planes.

4. The polyphasic multi-coil electric device of claim 1, wherein each of said first array of circumferentially spaced magnets and said second array of circumferentially spaced magnets comprise pairs of magnets, each pair of magnets including one magnet closer to said drive shaft than the other magnet.

5. The polyphasic multi-coil electric device of claim 4, wherein each of said pairs of magnets is aligned along a common radial axis extending outward in a radial direction with respect to said drive shaft.

6. The polyphasic multi-coil electric device of claim 1, wherein each of said electrically conductive coils is wrapped around a radial core extending outward in a radial direction with respect to said drive shaft.

7. The polyphasic multi-coil electric device of claim 1, wherein said electrically conductive coils are aligned end to end in a concentric circle around said drive shaft.

8. The polyphasic multi-coil electric device of claim 1, wherein each of said circumferentially spaced air coils is centered on a radial axis extending outward in a radial direction with respect to said drive shaft.

9. The polyphasic multi-coil electric device of claim 1, further comprising a plurality of successive stators interleaved with a plurality of successive rotors, wherein electrically conductive coils of said plurality of successive stators are electrically coupled to be selectively electrically energized between an open and a closed circuit state, resistance to rotation of said drive shaft reduced when in said open circuit state and increased when in said closed circuit state.

10. The polyphasic multi-coil electric device of claim 1, wherein said first rotor and said first stator define a first stage having a first diameter and said second rotor and said second stator define a second stage having a second diameter, said second diameter being greater than said first diameter.

11. The polyphasic multi-coil electric device of claim 1, wherein said first rotor and said first stator define a first stage having a first diameter and said second rotor and second stator define a second stage having a second diameter, said second diameter being less than said first diameter.

12. A polyphasic multi-coil electric device comprising:
a drive shaft; and
a first electric device stage including first, second, and third rotors interleaved with first, second, and third stators, said first, second, and third rotors coupled to said drive shaft and each of said first, second, and third stators comprising an aperture that receives said drive shaft, at least one of said first, second, and third stators further comprising circumferentially spaced air coils coupled thereto, said first rotor further comprising a first array of circumferentially spaced magnets coupled to said first rotor, said second rotor further comprising a second array of circumferentially spaced magnets coupled to said second rotor, and said third rotor further comprising a third array of circumferentially spaced magnets coupled to said third rotor,
wherein when said first, second and third rotors rotate with said drive shaft, said first, second, and third array of magnets are angularly offset in a drive shaft rotation direction from each other, each of said first, second, and third rotors and said first, second, and third stators provided in substantially parallel planes.

13. The polyphasic multi-coil electric device of claim 12, further comprising a second electric device stage, the second electric device stage comprising three rotors interleaved with three stators, said second electric device stage having a first diameter, said first electric device stage having a second diameter, said second diameter being less than said first diameter.

14. The polyphasic multi-coil electric device of claim 12, further comprising a second electric device stage, the second electric device stage comprising three rotors interleaved with three stators, said second electric device stage having a first diameter, said first electric device stage having a second diameter, said second diameter being greater than said first diameter.

15. The polyphasic multi-core electric device of claim 12, wherein each of said first array of circumferentially spaced magnets, said second array of circumferentially spaced magnets, and said third array of circumferentially spaced magnets comprise pairs of magnets, each pair of magnets including one magnet closer to said drive shaft than the other magnet.

16. The polyphasic multi-coil electric device of claim 15, wherein each of said pairs of magnets is aligned along a common radial axis extending outward in a radial direction with respect to said drive shaft.

17. The polyphasic multi-coil electric device of claim 12, wherein each of said electrically conductive coils is wrapped around a radial core extending outward in a radial direction with respect to said drive shaft.

18. The polyphasic multi-coil electric device of claim 12, wherein said electrically conductive coils are aligned end to end in a concentric circle around said drive shaft.

19. The polyphasic multi-coil electric device of claim 12, wherein each of said circumferentially spaced air coils is centered on a radial axis extending outward in a radial direction with respect to said drive shaft.

20. The electric device of claim 1, wherein said electrically conductive coils coupled to said first stator are at least in part co-planar with said first array of circumferentially spaced magnets.

21. The electric device of claim 1, wherein said air coils coupled to said second stator are at least in part co-planar with said second array of circumferentially spaced magnets.

22. The electric device of claim 12, wherein at least one of said first, second, and third stator comprises electrically conductive coils coupled thereto and said electrically conductive coils are at least in part co-planar with one of said first, second, or third array of circumferentially spaced magnets.

23. The electric device of claim 12, wherein said air coils coupled to at least one of said first, second, and third stator are at least in part co-planar with said first, second, or third array of circumferentially spaced magnets.

* * * * *